United States Patent
Nishimoto et al.

(10) Patent No.: US 11,597,786 B2
(45) Date of Patent: Mar. 7, 2023

(54) COMPOSITION FOR MODEL MATERIAL

(71) Applicant: MAXELL, LTD., Kyoto (JP)

(72) Inventors: Tomohisa Nishimoto, Kyoto (JP); Satoshi Kubo, Kyoto (JP)

(73) Assignee: MAXELL, LTD., Kyoto (JP)

(*) Notice: Subject to any disclaimer, the term of this patent is extended or adjusted under 35 U.S.C. 154(b) by 168 days.

(21) Appl. No.: 16/645,751

(22) PCT Filed: Sep. 13, 2018

(86) PCT No.: PCT/JP2018/034064
§ 371 (c)(1),
(2) Date: Mar. 9, 2020

(87) PCT Pub. No.: WO2019/102695
PCT Pub. Date: May 31, 2019

(65) Prior Publication Data
US 2020/0282636 A1    Sep. 10, 2020

(30) Foreign Application Priority Data

Nov. 22, 2017   (JP) ............................ JP2017-225156

(51) Int. Cl.
*C08F 220/18*   (2006.01)
*B33Y 70/00*    (2020.01)
(Continued)

(52) U.S. Cl.
CPC ...... *C08F 220/1804* (2020.02); *B29C 64/112* (2017.08); *B29C 64/393* (2017.08);
(Continued)

(58) Field of Classification Search
CPC ............ C08F 220/1804; C08F 220/343; C08F 290/068; B29C 64/112; B29C 64/393;
(Continued)

(56) References Cited

U.S. PATENT DOCUMENTS 10,703,025 B1 * 7/2020 Biesboer ............. C04B 35/5603
11,192,354 B2 * 12/2021 Backer .................. B33Y 80/00
(Continued)

FOREIGN PATENT DOCUMENTS

EP        3480227 A1    5/2019
JP     2007-002073 A    1/2007
(Continued)

OTHER PUBLICATIONS

Translation of International Preliminary Report on Patentability and Written Opinion of the International Searching Authority for PCT/JP2018/034064, dated May 26, 2020.
(Continued)

*Primary Examiner* — Nahida Sultana
(74) *Attorney, Agent, or Firm* — McDermott Will & Emery LLP

(57) ABSTRACT

The present invention relates to a model material composition for shaping a model material by a material jetting optical shaping method, comprising a polymerizable compound, a photopolymerization initiator and a siloxane compound having one polymerizable group per molecule, the siloxane compound having a number average molecular weight of 300 to 10,000.

16 Claims, 1 Drawing Sheet

(51) Int. Cl.
*B29C 64/112* (2017.01)
*B29C 64/393* (2017.01)
*B29C 64/40* (2017.01)
*C08K 3/013* (2018.01)
*C08F 220/34* (2006.01)
*C08G 77/06* (2006.01)
*C08G 77/18* (2006.01)
*C08G 77/20* (2006.01)
*C08K 5/00* (2006.01)
*B33Y 10/00* (2015.01)
*B33Y 40/20* (2020.01)

(52) U.S. Cl.
CPC .............. *B29C 64/40* (2017.08); *B33Y 70/00* (2014.12); *C08F 220/343* (2020.02); *C08G 77/06* (2013.01); *C08G 77/18* (2013.01); *C08G 77/20* (2013.01); *C08K 3/013* (2018.01); *C08K 5/0041* (2013.01); *B33Y 10/00* (2014.12); *B33Y 40/20* (2020.01)

(58) Field of Classification Search
CPC ........ B29C 64/40; C08G 77/06; C08G 77/18; C08G 77/20; C08K 3/013; C08K 5/0041; B33Y 10/00; B33Y 40/20; B33Y 70/00
See application file for complete search history.

(56) References Cited

U.S. PATENT DOCUMENTS

| | | | | |
|---|---|---|---|---|
| 2003/0064232 A1* | 4/2003 | Allen | ...................... | C08L 83/06 428/447 |
| 2010/0016488 A1* | 1/2010 | Karkkainen | ........... | C08G 77/04 524/391 |
| 2017/0152419 A1* | 6/2017 | Rantala | ................... | H01L 33/56 |
| 2018/0171038 A1 | 6/2018 | Yachi et al. | | |
| 2018/0258297 A1 | 9/2018 | Kitou et al. | | |
| 2018/0265720 A1 | 9/2018 | Kitou et al. | | |
| 2019/0009453 A1 | 1/2019 | Kitou et al. | | |
| 2019/0061236 A1* | 2/2019 | Rantala | ..................... | C08K 3/28 |
| 2019/0127517 A1* | 5/2019 | Vidavsky | ............... | B29C 64/112 |
| 2019/0233670 A1* | 8/2019 | Matsumoto | .............. | B41M 5/00 |
| 2020/0270454 A1* | 8/2020 | Jia | ............................ | C08K 5/56 |
| 2021/0080829 A1* | 3/2021 | Fukuzaki | ............... | C08G 65/18 |

FOREIGN PATENT DOCUMENTS

| | | |
|---|---|---|
| JP | 2010-006870 A | 1/2010 |
| JP | 2014-210871 A | 11/2014 |
| JP | 6060216 B2 | 1/2017 |
| WO | 2013/080741 A1 | 6/2013 |
| WO | 2016/134972 A1 | 9/2016 |
| WO | 2017/002964 A1 | 1/2017 |
| WO | 2017/047692 A1 | 3/2017 |
| WO | 2017/047693 A1 | 3/2017 |
| WO | 2018/003381 A1 | 1/2018 |

OTHER PUBLICATIONS

Japanese Notice of Reasons for Refusal issued in corresponding Japanese Patent Application No. 2019-201637, dated Mar. 16, 2021, with English translation.

Japanese Notice of Reasons for Refusal issued in corresponding Japanese Patent Application No. 2019-201638, dated Mar. 16, 2021, with English translation.

Extended European Search Report issued in corresponding EP Application No. 18881759.7, dated Aug. 9, 2021.

* cited by examiner

COMPOSITION FOR MODEL MATERIAL

CROSS REFERENCE

This application is the U.S. National Phase under 35 U.S.C. § 371 of International Application No. PCT/JP2018/034064, filed on Sep. 13, 2018, which claims the benefits of Japanese Application No. 2017-225156, filed on Nov. 22, 2017, the entire contents of which are hereby incorporated by reference.

TECHNICAL FIELD

The present invention relates to a model material composition (composition for a model material) for shaping a model material by a material jetting optical shaping method, a composition set for material jetting optical shaping which comprises the model material composition, and a method for producing an optically shaped article using the model material composition or the composition set for material jetting optical shaping.

BACKGROUND ART

Conventionally, a method for producing a three-dimensionally shaped article by irradiating a photocurable resin composition with light such as ultraviolet ray to form cured layers having a desired shape continuously is widely known. Particularly, a material jetting-mode (inkjet-mode) optical shaping method (also referred to as a "material jetting optical shaping method", hereinafter) in which a photocurable resin composition is ejected through a material jetting nozzle and is then irradiated with light such as ultraviolet ray immediately after the ejection to cure the resin composition so that cured layers each having a desired shape are laminated to produce a three-dimensionally shaped article has attracted attention widely as a shaping method which can be achieved using a small shaping device (a 3D printer) capable of producing a three-dimensionally shaped article freely on the basis of Computer Aided Design (CAD) data.

In general, in the material jetting optical shaping method, a three-dimensionally shaped product having a complicated shape such as a hollow shape can be generally produced by using a model material that finally constitutes the three-dimensionally shaped article and a support material for supporting the model material during three-dimensional shaping in combination. Therefore, in recent years, various resin compositions for model materials for use in material jetting optical shaping, each of which can be used in combination with a support material, have been developed. For example, Patent Document 1 discloses a resin composition for a model material, which comprises a monofunctional ethylenically unsaturated monomer, a polyfunctional ethylenically unsaturated monomer having no urethane group, a urethane-containing ethylenically unsaturated monomer and a photopolymerization initiator in specified amounts. In addition, Patent Document 2 discloses a resin composition for a model material, which comprises a monofunctional ethylenically unsaturated monomer, a polyfunctional ethylenically unsaturated monomer, an oligomer and a photopolymerization initiator.

PRIOR ART DOCUMENTS

Patent Documents

Patent Document 1: JP 6060216 B2
Patent Document 2: JP 2017-31249 A

SUMMARY OF THE INVENTION

Problems to be Solved by the Invention

Recently, it has been demanded to increase the speed of a material jetting optical shaping method. For achieving this demand, it is necessary to shorten the time required for a sequence of cycles from the landing and photocuring of a photocurable composition ejected through a material jetting nozzle, which forms a cured layer, to the landing of the photocurable composition subsequent ejected through the material jet nozzle, which forms a layer overlaid on the cured layer. However, in a resin composition for a model material as disclosed in Patent Document 1 or 2, in the case where a model material composition that lands previously is cured and then a model material composition that forms a next layer lands on the previously applied composition, the shape of the composition that lands previously may be lost due to the weight, the wet-spreading or the insufficient adhesion of the composition that is overlaid on the previously applied composition, even when a support material is provided. Furthermore, when the lamination cycle is repeated, sags may occur in the finished three-dimensional shape as the result of the interdiffusion between the model material and the model material or between the model material and the support material or the slipping out of the overlaid model material composition from the composition that has been applied previously. Therefore, it has been difficult to laminate layers of the model material composition in the vertical direction with high accuracy. For these reasons, the conventional resin compositions for model materials cannot meet the demand on the speed up of a material jetting optical shaping method, and there is still a demand for a model material composition which enables the production of a three-dimensional structure having high shaping accuracy at a high shaping speed.

In these situations, an object of the present invention is to provide a model material composition which is suitable for a material jetting optical shaping method and can achieve high shaping accuracy and excellent mechanical properties even in the high-speed shaping of a three-dimensional structure by a material jetting-mode technique.

Solutions to the Problems

The present invention provides the following preferred aspects.

[1] A model material composition for shaping a model material by a material jetting optical shaping method, comprising a polymerizable compound, a photopolymerization initiator and a siloxane compound having one polymerizable group per molecule, the siloxane compound having a number average molecular weight of 300 to 10,000.

[2] The model material composition according to [1], wherein, when the model material composition drips and lands on a cured article of the model material composition, a contact angle of a droplet of the model material composition against the cured article as measured 0.3 seconds after the landing is 40° or more.

[3] The model material composition according to [1] or [2], wherein the polymerizable group in the siloxane compound is a group selected from the group consisting of an acryloyl group, a methacryloyl group, a vinyl group, an allyl group and a vinyl ether group.

[4] The model material composition according to any one of [1] to [3], wherein the model material composition comprises the siloxane compound in an amount of 0.005 to 5% by mass, with respect to a total mass of the model material composition.

[5] The model material composition according to any one of [1] to [4], wherein the model material composition has a surface tension of 24 to 30 mN/m.

[6] The model material composition according to any one of [1] to [5], wherein the siloxane compound is a siloxane compound having the polymerizable group at one end thereof.

[7] The model material composition according to any one of [1] to [6], wherein the siloxane compound has a structure represented by formula (1):

$$R^1-\underset{\underset{H_2}{\|}}{C}-\underset{\underset{}{\|}}{\overset{O}{C}}-O-R^3-\underset{\underset{CH_3}{|}}{\overset{CH_3}{\underset{|}{Si}}}-(O-\underset{\underset{CH_3}{|}}{\overset{CH_3}{\underset{|}{Si}}})_n-R^2 \quad (1)$$

wherein:
$R^1$ represents a hydrogen atom or a methyl group;
$R^2$ represents a hydrogen atom or an alkyl group having 1 to 4 carbon atoms;
$R^3$ is selected from the group consisting of $(CH_2)_m$, $(EO)_x$, $(PO)_y$, and a combination thereof;
m represents a numerical value of 1 to 10;
(EO) represents $(C_2H_4O)$;
(PO) represents $(C_3H_6O)$;
x and y independently represent a numerical value of 0 to 50; and
n represents a numerical value of 3 to 220.

[8] The model material composition according to any one of [1] to [7], wherein the polymerizable compound comprises a monofunctional ethylenically unsaturated monomer (A), a polyfunctional ethylenically unsaturated monomer (B) and an oligomer (C).

[9] The model material composition according to [8], wherein the model material composition comprises the monofunctional ethylenically unsaturated monomer (A) in an amount of 50% by mass or more, with respect to a total mass of the polymerizable compound.

[10] The model material composition according to [8] or [9], wherein the model material composition comprises the polyfunctional ethylenically unsaturated monomer (B) in an amount of 1 to 30% by mass, with respect to the total mass of the polymerizable compound.

[11] The model material composition according to any one of [8] to [10], wherein the model material composition comprises the oligomer (C) in an amount of 1 to 30% by mass, with respect to the total mass of the polymerizable compound.

[12] The model material composition according to any one of [8] to [11], wherein the monofunctional ethylenically unsaturated monomer (A) is a monofunctional ethylenically unsaturated monomer having a cyclic structure in the molecule thereof.

[13] The model material composition according to any one of [8] to [12], wherein an SP value of each of the monofunctional ethylenically unsaturated monomer (A) and the polyfunctional ethylenically unsaturated monomer (B) is 11.0 or less.

[14] The model material composition according to any one of [1] to [13], wherein the model material composition further comprises a coloring agent.

[15] A composition set for material jetting optical shaping, comprising the model material composition according to any one of [1] to [14] and a support material composition for shaping a support material by a material jetting optical shaping method.

[16] The composition set for material jetting optical shaping according to [15], wherein the support material composition is soluble in water.

[17] A method for producing an optically shaped article using the model material composition according to any one of [1] to [14] or the composition set for material jetting optical shaping according to [15] or [16], the method comprising irradiating the model material composition or the composition set with an active energy ray in a wavelength of 320 to 410 nm at an accumulated light amount of 300 mJ/cm² or more per layer to cure the model material composition.

Effects of the Invention

According to the present invention, it is possible to provide a model material composition which is suitable for a material jetting optical shaping method and can achieve high shaping accuracy and excellent mechanical properties even in the high-speed shaping of a three-dimensional structure by a material jetting-mode technique.

MODE FOR CARRYING OUT THE INVENTION

Figure 1:
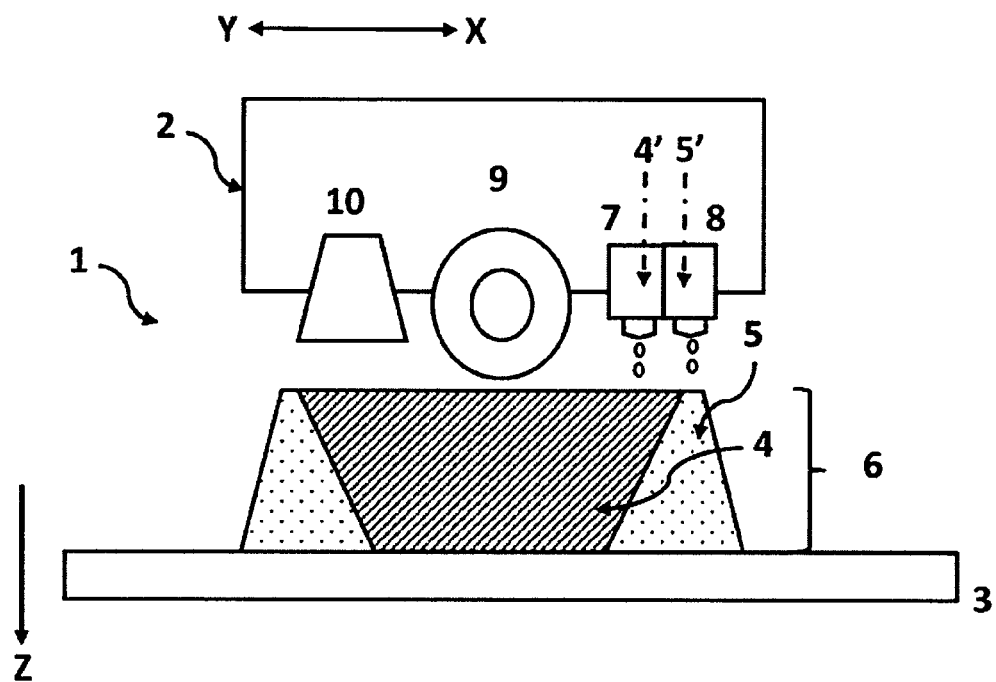
FIG. 1 is a diagram schematically illustrating a step (I) in one embodiment of the method for producing an optically shaped article according to the present invention.

Hereinafter, embodiments of the present invention will be described in detail. The scope of the present invention is not to be limited to the embodiments described herein, and various modifications may be made without departing from the scope of this invention.

<Model Material Composition>

The model material composition according to the present invention comprises a polymerizable compound, a photopolymerization initiator and a siloxane compound having one polymerizable group per molecule and having a number average molecular weight of 300 to 10,000.

When the model material composition of the present invention drips through a material jetting nozzle, a siloxane compound having the above-mentioned specified structure is distributed rapidly on the outermost surface of a droplet of the model material composition. Namely, in the case where the model material composition of the present invention drips through the material jetting nozzle continuously, the siloxane compound is distributed on both of the outermost surface of the dripped droplet of the model material composition and the outermost surface of a cured article of the model material composition on which the droplet of the composition lands. On the basis of the relationship between the dripped droplet and the cured article, the contact angle of the dripped model material composition against the surface of the cured article of the model material composition which has been applied previously can be increased. Furthermore, the intermolecular force between the siloxane compound on the surface of the cured article and the siloxane compound on the surface of the droplet can be exerted strongly and, as a result, the cured article of the model material composition which has been applied previously can bind to the dripped droplet strongly. Due to these two effects, strain or displacement becomes less likely to occur between the cured article of the model material composition which has been applied previously and the droplet of the model material composition which forms a next layer that will be overlaid on the cured article. In addition, the ability to recover upon the occurrence of the strain or displacement can be improved. Therefore, the model material composition of the present invention can be laminated in the vertical direction with high accuracy even when the model material composition is ejected through the material jetting nozzle continuously, and high shaping accuracy in high-speed shaping can be secured. The term "model material" as used herein principally refers to a cured article produced from the model material composition (or a cured article of the model material composition), and a product ultimately produced from the cured article is referred to as an "optically shaped article".

In the present invention, the number average molecular weight of the siloxane compound which the model material composition comprises is 300 to 10,000, preferably 400 or more, more preferably 500 or more, still more preferably 600 or more, and is preferably 9,000 or less, more preferably 8,000 or less, still more preferably 7,000 or less. If the number average molecular weight of the siloxane compound is less than 300, when the model material composition drips through a material jetting nozzle, the siloxane compound is uniformized in a dripped droplet and is therefore buried, and therefore it is difficult to distribute a sufficient amount of the siloxane compound on the outermost surface of the droplet. If the number average molecular weight of the siloxane compound is more than 10,000, although it is easy to distribute the siloxane compound on the outermost surface of the droplet, the siloxane compound tends to be unevenly distributed on the surface of the droplet and therefore the contact angle against a droplet or a cured article of the model material composition with which the siloxane compound is to be contacted may vary. When the number average molecular weight of the siloxane compound falls within a range from the upper limit value to the lower limit value, it is possible to rapidly and evenly distribute a sufficient amount of the siloxane compound on the outermost surface of a droplet of the model material composition which is dripped through a material jetting nozzle, and therefore it is possible to improve the shaping accuracy in high-speed shaping.

The number average molecular weight of the siloxane compound can be determined by employing a gel permeation chromatography (GPO) or a matrix-assisted laser desorption ionization-time of flight mass spectrometry (MALDI-TOF-MS) method.

In the present invention, the polymerizable group contained per molecule of the siloxane compound is not particularly limited, as long as the polymerizable group can be involved in a crosslinking reaction with the polymerizable compound in the model material composition through the action of an active radical or an acid generated form the photopolymerization initiator contained in the model material composition. Examples of the polymerizable group include an acryloyl group, a methacryloyl group, a vinyl group, an allyl group, a vinyl ether group, an acrylamide group, a methacrylamide group, an epoxy group and an oxetanyl group. Among these groups, a group selected from the group consisting of an acryloyl group, a methacryloyl group, a vinyl group, an allyl group and a vinyl ether group is preferred, and an acryloyl group or a methacryloyl group is more preferred, from the viewpoint of a reaction velocity and a reaction efficiency in photocuring. In this regard, an alkoxy group that is a hydrolyzable group having poor photopolymerizability cannot be regarded as the one polymerizable group contained per molecule which is one of the subjects of the present invention.

Particularly, when the polymerizable group in the siloxane compound is a polymerizable group having a slower reaction velocity than the reaction velocity of the polymerizable group in the polymerizable compound constituting the model material composition, after landing of a droplet of the model material composition dripped through the material jetting nozzle, the siloxane compound can be distributed rapidly and evenly on the outermost surface of the droplet before the crosslinking of the siloxane compound in the subsequence curing step. Therefore, in the present invention, it is preferred that the polymerizable group in the siloxane compound is a polymerizable group having a slower reaction velocity than the reaction velocity of the polymerizable group in the polymerizable compound constituting the model material composition. More specifically, in one embodiment of the present invention, it is preferred that the polymerizable group in the siloxane compound is, for example, a methacryloyl group, and it is more preferred that the polymerizable group in the siloxane compound is a methacryloyl group and the polymerizable group in the polymerizable compound constituting the model material composition is an acryloyl group.

In the present invention, the siloxane compound is not particularly limited with respect to the structure thereof, as long as the siloxane compound has one polymerizable group per molecule and has a number average molecular weight of 300 to 10,000. It is possible to use a conventionally known siloxane compound having one polymerizable group at one end thereof or in a side chain thereof. If the siloxane compound has two or more polymerizable groups, the crosslinking reaction between the siloxane compound and the polymerizable compound can proceed easily in a droplet of the model material composition which is dripped through a material jetting nozzle, and therefore it becomes difficult to rapidly and evenly distribute the siloxane compound on the outermost surface of the droplet before the crosslinking of the siloxane compound and it becomes also difficult to improve the shaping accuracy. In a droplet of the model material composition which is dripped through the material jetting nozzle, when the siloxane compound is distributed on the outermost surface of the droplet and a siloxane group in the siloxane compound is located on the outermost side of the droplet, it is possible to improve the shaping accuracy in high-speed shaping effectively. For these reasons, it is preferred that the siloxane compound, which the model material composition of the present invention comprises, is a siloxane compound having a polymerizable group at one end thereof.

In the present invention, one example of the siloxane compound, which the model material composition comprises, is a siloxane compound having a structure represented by the following formula (1). The siloxane compounds may be used singly, or two or more types thereof may be used in combination. When the siloxane compound having the structure represented by the following formula (1) is used, it is possible to improve the shaping accuracy in high-speed shaping effectively.

[Chemical formula 2]

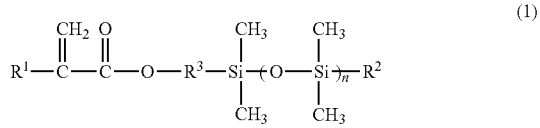

In formula (1), $R^1$ represents a hydrogen atom or a methyl group, and is preferably a methyl group.

$R^2$ represents a hydrogen atom or an alkyl group having 1 to 4 carbon atoms, and is preferably a methyl group.

$R^3$ is selected from the group consisting of $(CH_2)_m$, $(EO)_x$, $(PO)_y$, and any combination thereof. m is 1 to 10, preferably 2 to 6, more preferably 2 to 4. (EO) represents $(C_2H_4O)$, (PO) represents $(C_3H_6O)$, and x and y independently represent 0 to 50. $R^3$ is preferably $(CH_2)_m$.

n is 3 to 220, preferably 10 to 200, more preferably 20 to 100.

As the siloxane compound having the structure represented by formula (1), a siloxane compound represented by formula (2):

[Chemical formula 3]

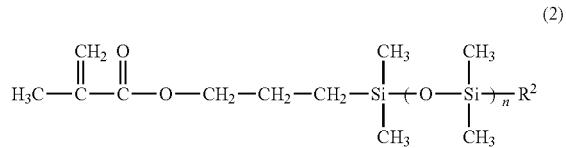

wherein n represents a numerical value of 3 to 220; $R^2$ represents a hydrogen atom or an alkyl group having 1 to 4 carbon atoms is preferred, and a siloxane compound represented by formula (3):

[Chemical formula 4]

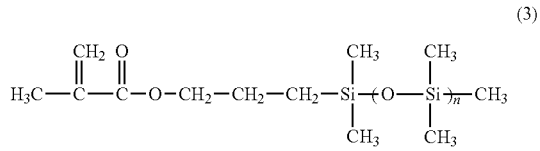

wherein n represents a numerical value of 3 to 220 is more preferred.

In the present invention, as the siloxane compound which the model material composition comprises, a commercially available product may be used. In the present invention, examples of the commercially available product suitable as the siloxane compound include reactive silicone oils each having a single-end-type methacryloyl group, such as X-22-2404 (molecular weight: 420), X-22-174ASX (molecular weight: 900), X-22-174BX (molecular weight; 2,300), X-24-8201 (molecular weight: 2,730), X-22-174DX (molecular weight: 4,600) and KF-2012 (molecular weight: 4,600) (all of which are manufactured by Shin-Etsu Chemical Co., Ltd.).

The content of the siloxane compound having one polymerizable group per molecule in the model material composition of the present invention is preferably 0.005% by mass or more, more preferably 0.01% by mass or more, still more preferably 0.02% by mass or more, particularly preferably 0.05% by mass or more, and is preferably 5% by mass or less, more preferably 3% by mass or less, still more preferably 1% by mass or less, with respect to the total mass of the model material composition. When the content of the siloxane compound falls within the range from the upper limit to the lower limit, it is possible to evenly distribute a sufficient amount of the siloxane compound on the outermost surface of a droplet of the model material composition dripped through the material jetting nozzle, and it also becomes possible to improve the shaping accuracy in high-speed shaping effectively. In the case where the model material composition comprises two or more siloxane compounds each having one polymerizable group per molecule, the above-mentioned range of the content is defined as the sum of the contents of these siloxane compounds.

In the present invention, the model material composition may comprise a siloxane compound other than the siloxane compound having one polymerizable group per molecule, as long as the effects of the present invention cannot be interfered. Examples of the siloxane compound other than the siloxane compound having one polymerizable group per molecule include: a siloxane compound having no polymerizable group in the molecule thereof; a siloxane compound having two or more polymerizable groups per molecule in a side chain of the molecule thereof; a siloxane compound having polymerizable groups at both ends of the molecule thereof; and a siloxane compound having polymerizable groups in a side chain of the molecule thereof and at one end or both ends of the molecule thereof. Specific examples of the siloxane compound include polyether-modified polydimethylsiloxane, polyester-modified polydimethylsiloxane, and polyaralkyl-modified polydimethylsiloxane. As the siloxane compound, a commercially available product may be used. Examples of the siloxane compound having no polymerizable group in the molecule thereof include BYK-300, BYK-302, BYK-306, BYK-307, BYK-310, BYK-315, BYK-320, BYK-322, BYK-323, BYK-325, BYK-330, BYK-331, BYK-333, BYK-337, BYK-341, BYK-344, BYK-345, BYK-346, BYK-347, BYK-348, BYK-378 and BYK-UV3510 (all of which are manufactured by BYK Japan KK); examples of the siloxane compound having two or more acryloyl groups per molecule in a side chain of the molecule thereof include TEGO-Rad2100 and TEGO-Rad2500 (all of which are manufactured by Degussa AG); examples of the siloxane compound having two or more methacryloyl group per molecule in a side chain of the molecule thereof include DMS-044, RMS-033 and RMS-083 (all of which are manufactured by Gelest, Inc.); examples of the siloxane compound having acryloyl groups at both ends of the molecule thereof include BYK-UV3500 and BYK-UV3570 (all of which are manufactured by BYK Japan KK) and X-22-2445 (which is manufactured by Shin-Etsu Chemical Co., Ltd.); examples of the siloxane compound having methacryloyl groups at both ends of the molecule thereof include X-22-164, X-22-164AS, X-22-164A, X-22-164B, X-22-164C and X-22-164E (all of which are manufactured by Shin-Etsu Chemical Co., Ltd.), and DMS-R05, DMS-R11, DMS-R18, DSM-R22, DSM-R31 and DMS-U21 (all of which are manufactured by Gelest, Inc.); and examples of the siloxane compound having vinyl groups at both ends of the molecule thereof include DMS-V00, DMS-V03, DMS-V05, DMS-V21, DMS-V22, DMS-V25, DMS-V31, DMS-V33 and DMS-V35 (all of which are manufactured by Gelest, Inc.).

In the case where the model material composition comprises the siloxane compound other than the siloxane compound having one polymerizable group per molecule, the content of the other siloxane compound is preferably 50% by mass or less, more preferably 20% by mass or less, still more preferably 10% by mass or less, with respect to the total mass of the siloxane compound having one polymerizable group per molecule, contained in the model material composition. It is particularly preferred that the model material composition is substantially free of the other siloxane compound. When the content of the siloxane compound other than the siloxane compound having one polymerizable group per molecule falls within the above-mentioned range, the shaping accuracy due to the siloxane compound having one polymerizable group per molecule can be achieved satisfactorily. In contrast, if the content of the siloxane compound other than the siloxane compound having one polymerizable group per molecule, such as a siloxane compound having two or more polymerizable groups per molecule and a siloxane compound having no polymerizable group per molecule, is too large, the surface property of a shaped article may be deteriorated or the glass transition temperature (Tg) of the shaped article may decrease, and the hardness or heat resistance of the shaped article may be deteriorated. In the model material composition of the present invention, the lower limit value of the content of the siloxane compound other than the siloxane compound having one polymerizable group per molecule is not particularly limited. The model material composition may be substantially free of the siloxane compound other than the siloxane compound having one polymerizable group per molecule. In general, the content of the siloxane compound other than the siloxane compound having one polymerizable group per molecule is 0.05% by mass or more, and may be, for example, 0.1% by mass or more, with respect to the total mass of the siloxane compound having one polymerizable group per molecule contained in the model material composition.

The model material composition of the present invention comprises a polymerizable compound. It is preferred that the model material composition of the present invention comprises a monofunctional ethylenically unsaturated monomer (A) as a polymerizable compound. The monofunctional ethylenically unsaturated monomer (A) is a component having a property to be polymerized and cured by the irradiation with an active energy ray such as ultraviolet ray, and is a polymerizable monomer having one ethylenically unsaturated double bond in the molecule thereof. The term "(meth)acylate" as used herein refers to one or both of an acrylate and a methacrylate, and the term "(meth)acrylamide" refers to one or both of an acrylamide and a methacrylamide. The monofunctional ethylenically unsaturated monomer (A) may be used singly, or two or more thereof may be used in combination.

In the present invention, examples of the monofunctional ethylenically unsaturated monomer (A) include: an alkyl (meth)acrylate having a linear or branched alkyl group; a (meth)acrylate having a cyclic structure such as an alicyclic structure, an aromatic cyclic structure and a heterocyclic structure in the molecule thereof; and a monofunctional ethylenically unsaturated monomer containing a nitrogen atom, such as (meth)acrylamide and N-vinyllactam. The term "alicyclic structure" as used herein refers to an aliphatic cyclic structure in which carbon atoms are bonded in a cyclic form, the term "aromatic cyclic structure" as used herein refers to an aromatic cyclic structure in which carbon atoms are bonded in a cyclic form, and the term "heterocyclic structure" as used herein refers to a structure in which carbon atoms and at least one hetero atom are bonded in a cyclic form.

An example of the alkyl (meth)acrylate having a linear or branched alkyl group is an alkyl (meth) acrylate containing a linear or branched alkyl group preferably having 4 to 30 carbon atoms, more preferably 6 to 20. Specific examples include methyl (meth)acrylate, ethyl (meth)acrylate, isobutyl (meth)acrylate, amyl (meth)acrylate, isoamyl (meth)acrylate, octyl (meth)acrylate, isooctyl (meth)acrylate, decyl (meth)acrylate, isodecyl (meth)acrylate, lauryl (meth)acrylate, isomyristyl (meth)acrylate, stearyl (meth)acrylate, isostearyl (meth)acrylate, 2-ethylhexyl-diglycol (meth)acrylate, stearyl (meth)acrylate, isostearyl (meth)acrylate, t-butyl (meth)acrylate, β-carboxyethyl (meth)acrylate, 2-hydroxyethyl (meth)acrylate, 2-hydroxypropyl (meth)acrylate, 2-hydroxybutyl (meth)acrylate, 2-(2-ethoxyethoxy)ethyl (meth)acrylate, butoxyethyl (meth)acrylate, ethoxy-diethylene glycol (meth)acrylate, methoxy-triethylene glycol (meth)acrylate, methoxy-polyethylene glycol (meth)acrylate, methoxydipropylene glycol (meth)acrylate, caprolactone (meth)acrylate and 2-(meth)acryloyloxyethyl-succinic acid.

An example of the (meth)acrylate having an alicyclic structure is a (meth)acrylate containing an alicyclic structure having preferably 6 to 20 carbon atoms, more preferably 8 to 15 carbon atoms. Specific examples include cyclohexyl (meth)acrylate, 4-t-butylcyclohexyl (meth)acrylate, isobornyl (meth)acrylate, dicyclopentanyl (meth)acrylate, adamantyl (meth)acrylate, 3,3,5-trimethylcyclohexanol (meth)acrylate and 2-(meth)acryloyloxyethylhexahydrophthalic acid.

An example of the (meth)acrylate having an aromatic cyclic structure is a (meth)acrylate containing an aromatic cyclic structure having preferably 6 to 20 carbon atoms, more preferably 8 to 15 carbon atoms. Specific examples include phenoxyethyl (meth)acrylate, phenoxy-polyethylene glycol (meth)acrylate, 2-hydroxy-3-phenoxypropyl (meth)acrylate, nonylphenolethylene oxide adduct (meth)acrylate, 2-(meth)acryloyloxyethyl-phthalic acid and neopentylglycol-acrylic acid-benzoic acid ester.

An example of the (meth)acrylate having a heterocyclic structure is a (meth)acrylate containing a heterocyclic structure having preferably 5 to 20 carbon atoms, more preferably 7 to 15 carbon atoms. Specific examples include tetrahydrofurfuryl (meth)acrylate, cyclic trimethylolpropane formal (meth)acrylate, 4-(meth)acryloyloxymethyl-2-methyl-2-ethyl-1,3-dixolane and 4-(meth)acryloyloxymethyl-2-cyclohexyl-1,3-dioxolane.

Examples of the monofunctional ethylenically unsaturated monomer containing a nitrogen atom, which is different from the aforementioned (meth)acrylate, include (meth)acrylamide [e.g., N,N-dimethylacrylamide, N,N-diethylacrylamide, N-isopropylacrylamide, hydroxyethylacrylamide, hydroxypropylacrylamide, N,N-acryloyl morpholine], N-vinyllactams [e.g., N-vinylpyrrolidone, N-vinylcaprolactam], and N-vinylformamide.

Among these compounds, a monofunctional ethylenically unsaturated monomer having a cyclic structure in the molecule thereof is preferred as the monofunctional ethylenically unsaturated monomer (A) which the model material composition comprises. When The monofunctional ethylenically unsaturated monomer (A) having a cyclic structure in the molecule thereof is used, compatibility with the siloxane compound that is an essential component for the model material composition is improved, as compared with the case of using the other monomers each having no cyclic structure, and a model material shaped article made from the model material composition may have a higher glass transition temperature (Tg) and superior hardness and heat resistance. In the model material composition of the present invention, the content of the monofunctional ethylenically unsaturated monomer having a cyclic structure in the molecule thereof is preferably 50% by mass or more, more preferably 80% by mass or more, with respect to the total mass of the monofunctional ethylenically unsaturated monomers (A). It is possible that all of the monofunctional ethylenically unsaturated monomer(s) (A) contained in the model material composition may be monofunctional ethylenically unsaturated monomers each having a cyclic structure in the molecule thereof.

The monofunctional ethylenically unsaturated monomer (A) is preferably a (meth)acrylate monomer. Particularly, the monofunctional ethylenically unsaturated monomer (A) is preferably a (meth)acrylate monomer having a cyclic structure in the molecule thereof, more preferably comprises at least one compound selected from the group consisting of isobornyl (meth)acrylate, phenoxyethyl (meth)acrylate, 3,3,5-trimethylcyclohexanol (meth)acrylate and cyclic trimethylolpropane formal (meth)acrylate, is still more preferably isobornyl (meth)acrylate or phenoxyethyl (meth)acrylate, and is particularly preferably isobornyl acrylate. Particularly, when a monofunctional (meth)acrylate monomer having an alicyclic structure in the molecule thereof is used, compatibility with the siloxane compound that is an essential component for the model material composition is improved, as compared with the case of using a monomer having another aromatic cyclic structure or another heterocyclic structure, and a model material shaped article made from the model material composition may have a higher glass transition temperature (Tg) and superior hardness and heat resistance.

The content of the monofunctional ethylenically unsaturated monomer (A) in the model material composition of the present invention is preferably 50% by mass or more, more preferably 55% by mass or more, still more preferably 60% by mass or more, with respect to the total mass of the polymerizable compounds contained in the model material composition. When the content of the monofunctional ethylenically unsaturated monomer (A) is equal to or more than the lower limit value, it becomes easy to dilute the siloxane compound that is an essential component for the model material composition and to be compatible with the siloxane compound, and also it is possible to align the siloxane compound on the surface of a shaped article rapidly in the curing step. In this manner, it is possible to impart proper strength and hardness to the model material composition, and to prevent the warpage of the resultant model material (finally an optically shaped article). In addition, it is possible to improve the surface properties of the resultant optically shaped article. The content of the monofunctional ethylenically unsaturated monomer (A) is preferably 95% by mass or less, more preferably 90% by mass or less, still more preferably 80% by mass or less, with respect to the total mass of the polymerizable compounds contained in the model material composition. When a polyfunctional ethylenically unsaturated monomer (B) and an oligomer (C) are added in proper amounts in addition to the monofunctional ethylenically unsaturated monomer (A), it is possible to produce a shaped article having high mechanical strength.

It is preferred that the model material composition of the present invention comprises a polyfunctional ethylenically unsaturated monomer (B) as the polymerizable compound. The polyfunctional ethylenically unsaturated monomer (B) is a component having a property to be polymerized and cured by the irradiation with an active energy ray, and is a polymerizable monomer having two or more ethylenically unsaturated double bonds in the molecule thereof. The polyfunctional ethylenically unsaturated monomer (B) may be used singly, or two or more types thereof may be used in combination.

Examples of the polyfunctional ethylenically unsaturated monomer (B) include: a linear or branched alkylene glycol di(meth)acrylate or alkylene glycol tri(meth)acrylate, an alkylene glycol tetra(meth)acrylate, an alkylene glycol penta(meth)acrylate and an alkylene glycol hexa(meth)acrylate each having 10 to 25 carbon atoms, such as 1,3-butanediol di(meth)acrylate, 1,4-butanediol di(meth)acrylate, 1,6-hexanediol di(meth)acrylate, 1,9-nonanediol di(meth)acrylate, 1,10-decanediol di(meth)acrylate, 2-n-butyl-2-ethyl-1,3-propanediol di(meth)acrylate, 3-methyl-1,5-pentanediol di(meth)acrylate, diethylene glycol di(meth)acrylate, triethylene glycol di(meth)acrylate, tetraethylene glycol di(meth)acrylate, polyethylene glycol (200) di(meth)acrylate, polyethylene glycol (400) di(meth)acrylate, polyethylene glycol (600) di(meth)acrylate, polyethylene glycol (1000) di(meth)acrylate, dipropylene glycol di(meth)acrylate, tripropylene glycol di(meth)acrylate, polypropylene glycol (400) di(meth)acrylate, polypropylene glycol (700) di(meth)acrylate, neopentyl glycol di(meth)acrylate, hydroxypivalic acid neopentyl glycol di(meth)acrylate, polytetramethylene glycol di(meth)acrylate, trimethylolpropane tri(meth)acrylate, pentaerythritol tri(meth)acrylate, glycerin propoxy tri(meth)acrylate, ditrimethylol propane tetra(meth)acrylate, pentaerythritol tetra(meth)acrylate, dipentaerythritol penta(meth)acrylate and dipentaerythritol hexa(meth)acrylate: a di(meth)acrylate or a tri(meth)acrylate each containing a cyclic structure having 10 to 30 carbon atoms, such as cyclohexanedimethanol di(meth)acrylate, dimethyloltricyclodecane di(meth)acrylate, bisphenol-A ethylene oxide adduct di(meth)acrylate and bisphenol-A propylene oxide adduct di(meth)acrylate; (meth)acrylic acid esters containing a vinyl ether group; and a bifunctional or higher functional aminoacrylate.

An example of the (meth)acrylic acid esters containing a vinyl ether group is 2-(vinyloxyethoxy)ethyl (meth)acrylate.

The bifunctional or higher functional aminoacrylate is considered to be able to prevent the inhibition of a polymerization by oxygen contained in the air, and can improve a curing velocity upon the irradiation with ultraviolet ray, particularly upon the irradiation with low-energy ultraviolet ray using a light-emitting diode (LED). Examples of the bifunctional or higher functional aminoacrylate include amino (meth)acrylate, amine-modified polyether (meth)acrylate, amine-modified polyester (meth)acrylate, amine-modified epoxy (meth)acrylate and amine-modified urethane (meth)acrylate.

Among these compounds, from the viewpoint of the improvement in the curability of the model material composition, a (meth)acrylate monomer is preferred; dipropylene glycol di(meth)acrylate, tripropylene glycol di(meth)acrylate, glycerin propoxy tri(meth)acrylate, 1,6-hexanediol di(meth)acrylate, dimethylol tricyclodecane di(meth)acrylate, and a bifunctional or higher functional aminoacrylate are more preferred; dipropylene glycol di(meth)acrylate, tripropylene glycol di(meth)acrylate, glycerin propoxy tri(meth)acrylate and a bifunctional or higher functional aminoacrylate are still more preferred; dipropylene glycol diacrylate, tripropylene glycol diacrylate and a bifunctional or higher functional aminoacrylate are particularly preferred.

The content of the polyfunctional ethylenically unsaturated monomer (B) in the model material composition of the present invention is preferably 1 to 30% by mass, more preferably 3% by mass or more, still more preferably 5% by mass or more, and is more preferably 28% by mass or less, still more preferably 25% by mass or less, with respect to the total mass of the polymerizable compounds contained in the model material composition. When the content of the polyfunctional ethylenically unsaturated monomer (B) falls within the range from the upper limit to the lower limit, it is possible to achieve both of high shaping accuracy and excellent mechanical properties in high-speed shaping.

In addition, in the model material composition of the present invention, the content of a hydrophilic (water-soluble) ethylenically unsaturated monomer is preferably smaller. When the content of the hydrophilic ethylenically unsaturated monomer in the model material composition is small, the effect to compatibilize the siloxane compound that is an essential component for the model material composition can be enhanced and the siloxane compound can be aligned on the surface of a shaped article rapidly in the curing step, and consequently the shaping accuracy can be improved. Furthermore, it is possible to prevent the swelling-induced deformation of a model material (finally an optically shaped article) due to the presence of water or the absorption of moisture during photocuring or after curing. The content of the hydrophilic ethylenically unsaturated monomer in the model material composition of the present invention is preferably 50% by mass or less, more preferably 25% by mass or less, still more preferably 10% by mass or less, with respect to the total mass of the monofunctional ethylenically unsaturated monomer (A), the polyfunctional ethylenically unsaturated monomer (B) and the oligomer (C). In one preferred embodiment of the present invention, the model material composition does not comprise the hydrophilic ethylenically unsaturated monomer (i.e., 0% by mass). In other words, all of the monofunctional ethylenically unsaturated monomer (A) and the polyfunctional ethylenically unsaturated monomer (B) are hydrophobic (water-insoluble) monomers. The term "hydrophilic (water-soluble) ethylenically unsaturated monomer" as used herein refers to an ethylenically unsaturated monomer having an SP value of more than 11.0. Examples of the hydrophilic ethylenically unsaturated monomer include a hydroxyl group-containing (meth)acrylate, a (meth)acrylamide derivative, (meth)acryloylmorpholine, N-vinyllactam compounds and N-vinylformamide. A more specific example is a water-soluble monofunctional ethylenically unsaturated monomer which a support material composition as mentioned below may comprise.

In the present invention, it is preferred that the ethylenically unsaturated monomer which the model material composition comprises is hydrophobic, and the SP value of each of the monofunctional ethylenically unsaturated monomer (A) and the polyfunctional ethylenically unsaturated monomer (B) is preferably 11.0 or less, more preferably 10.5 or less, still more preferably 10.0 or less. The lower limit value of the SP value of each of the monofunctional ethylenically unsaturated monomer (A) and the polyfunctional ethylenically unsaturated monomer (B) is preferably 7.0 or more, more preferably 7.2 or more, still more preferably 7.5 or more. As the unit of an SP value, "$(cal/cm^3)^{1/2}$" which has been employed conventionally is used. In the case where an SP value is to be converted to an SI unit, the SP value is converted to an SI unit ($(J/cm^3)^{1/2}$) by multiplying by about 2.0455. When the SP value of each of the monofunctional ethylenically unsaturated monomer (A) and the polyfunctional ethylenically unsaturated monomer (B) falls within the range from the upper limit to the lower limit, the difference from an SP value of the siloxane compound that is an essential component for the model material composition becomes small, and thus, the compatibility may be improved and therefore the shaping accuracy can be improved. Furthermore, it is possible to prevent the swelling-induced deformation of a model material (finally an optically shaped article) due to the presence of water or the absorption of moisture during photocuring or after curing. Furthermore, in the model material composition of the present invention, when the contents of the monofunctional ethylenically unsaturated monomer (A) and the polyfunctional ethylenically unsaturated monomer (B) each having a small difference in the SP value from the siloxane compound to be used are increased, the surface properties of the resultant shaped product can be improved.

The SP value is a solubility parameter, and the SP value of each monomer is known to be determined by calculation from a molecular structure of each of the monomers. With respect to the solubility parameter of each of the ethylenically unsaturated monomers in the present description, it is known that the solubility parameter of an acrylic monomer can be determined by calculation from the molecular structure thereof, and solubility parameter of each of the (meth)acrylic monomers in the present description refers to a value determined at 25° C. by a Fedors method ("Basic science of coating", edited by Yuji Harasaki, Chapter 3, page 35. 1977, published by Maki Shobo).

The model material composition of the present invention preferably comprises an oligomer (C) as the polymerizable compound. The oligomer (C) is a component having a property to be polymerized and cured by the irradiation with an active energy ray. When the oligomer (C) is added, the breaking strength of the resultant model material can be increased and therefore an optically shaped article that has proper level of toughness and is less likely to be broken upon bending can be produced.

The term "oligomer" as used herein refers to a component having a weight average molecular weight Mw of 800 to 10,000. The term more preferably refers to a component of which the lower limit value of the weight average molecular weight Mw is more than 1,000. The term "weight average molecular weight Mw" refers to a weight average molecular weight in terms of a polystyrene content as measured by GPC (Gel Permeation Chromatography). The oligomer (C) may be used singly, or two or more thereof may be used in combination.

Examples of the oligomer (C) include an epoxy (meth)acrylate oligomer, a polyester (meth)acrylate oligomer, a urethane (meth)acrylate oligomer and a polyether (meth)acrylate oligomer. As the oligomer (C), a polyfunctional oligomer having a functionality of two or more is preferred, and a bifunctional oligomer is more preferred. From the viewpoint that the range of choices for a material is broad and a material having a wide variety of properties can be selected, an oligomer having a urethane group is preferred, a urethane (meth)acrylate oligomer is more preferred, and a urethane acrylate oligomer is still more preferred.

The content of the oligomer (C) in the model material composition of the present invention is preferably 1 to 30% by mass, more preferably 5% by mass or more, still more preferably 10% by mass or more, and is more preferably 25% by mass or less, more preferably 23% by mass or less, with respect to the total mass of the polymerizable compounds contained in the model material composition. When the content of the oligomer (C) falls within the range from the upper limit to the lower limit, the breaking strength of the resultant model material can be increased while keeping the viscosity of the model material composition in a proper range, and therefore an optically shaped article that has proper level of toughness and is less likely to be broken upon bending can be produced.

The model material composition of the present invention preferably comprises a monofunctional ethylenically unsaturated monomer (A), a polyfunctional ethylenically unsaturated monomer (B) and an oligomer (C) as polymerizable compounds. By adjusting the amounts of the three types of polymerizable compounds to be added, it becomes easy to control the physical properties and mechanical properties (e.g., strength, hardness, toughness) of a model material produced from the model material composition to values falling within desired ranges, and therefore it is possible to obtain an optically shaped article having excellent mechanical properties.

The model material composition of the present invention comprises a photopolymerization initiator. The photopolymerization initiator is not particularly limited, as long as the photopolymerization initiator is a compound capable of accelerating a radical reaction upon the irradiation with ultraviolet ray, near-ultraviolet ray or light having a wavelength falling within the visible light region. Examples of the photopolymerization initiator include: a benzoin compound having 14 to 18 carbon atoms [e.g., benzoin, benzoin methyl ether, benzoin ethyl ether, benzoin propyl ether, benzoin isobutyl ether]; an acetophenone compound having 8 to 18 carbon atoms [e.g., acetophenone, 2,2-diethoxy-2-phenylacetophenone, 2,2-diethoxy-2-phenylacetophenone, 1,1-dichloroacetophenone, 2-hydroxy-2-methyl-phenyl propan-1-one, diethoxyacetophenone, 1-hydroxycyclohexylphenyl ketone, 2-methyl-1-[4-(methylthio)phenyl]-2-morpholinopropan-1-one]; an anthraquinone compound having 14 to 19 carbon atoms [e.g., 2-ethylanthraquinone, 2-t-butylanthraquinone, 2-chloroanthraquinone, 2-amylanthraquinone]; a thioxanthone compound having 13 to 17 carbon atoms [e.g., 2,4-diethylthioxanthone, 2-isopropylthioxanthone, 2-chlorothioxanthone]; a ketal compound having 16 to 17 carbon atoms [e.g., acetophenone dimethyl ketal, benzyl dimethyl ketal]; a benzophenone compound having 13 to 21 carbon atoms [e.g., benzophenone, 4-benzoyl-4'-methyldiphenyl sulfide, 4,4'-bis methylaminobenzophenone]; an acylphosphine oxide compound having 22 to 28 carbon atoms [e.g., 2,4,6-trimethylbenzoyl-diphenyl-phosphine oxide, bis-(2,6-dimethoxybenzoyl)-2,4,4-trimethylpentylphosphine oxide, bis(2,4,6-trimethylbenzoyl)-phenylphosphine oxide]; and a mixture thereof. These compounds may be used singly, or two or more of them may be used in combination. Among these compounds, from the viewpoint that excellent light resistance can be imparted to a shaped article obtained by the photocuring of the model material composition and the yellowish discoloration of the shaped article can be prevented, the photopolymerization initiator preferably comprises at least one compound selected from an acetophenone compound and an acylphosphine oxide compound, and is preferably 1-hydroxycyclohexylphenyl ketone, 2,4,6-trimethylbenzoyl-diphenyl-phosphine oxide, 2-methyl-1-[4-(methylthio)phenyl]-2-morpholinopropan-1-one or the like. As the photopolymerization initiator, a commercially available product may be used, such as DAROCURE TPO, IRGACURE184 and IRGACURE907 which are manufactured by BASF.

The content of the photopolymerization initiator in the model material composition is preferably 2 to 15% by mass, more preferably 3 to 10% by mass, based on the total mass of the model material composition. When the content of the photopolymerization initiator is equal to or more than the lower limit, it is possible to reduce the amount of the polymerization component in an unreacted form sufficiently and to improve the curability of the model material satisfactorily. When the content of the photopolymerization initiator is equal to or less than the upper limit, it is possible to reduce the amount of the photopolymerization initiator that remains in an unreacted form in the model material and to prevent the yellowish discoloration of an optically shaped article which may be caused by the photopolymerization initiator that remains in an unreacted form.

The model material composition may comprise the other additives, as long as the effects of the present invention cannot be interfered. Examples of the "other additive" include a storage stabilizer, a surface modifier other than the siloxane compound, an antioxidant agent, a coloring agent, an ultraviolet ray absorber, a light stabilizer, a polymerization inhibitor, a chain transfer agent, filler, a diluting solvent and a thickening agent.

The storage stabilizer is a component capable of increasing the storage stability of the model material composition. In addition, the storage stabilizer can prevent head clogging caused by the polymerization of polymerizable compounds by thermal energy. Examples of the storage stabilizer include a hindered amine-based compound (HALS), a phenol-based antioxidant agent and a phosphorus-containing antioxidant agent. Specific examples include hydroquinone, methoquinone, benzoquinone, p-methoxyphenol, hydroquinone monomethyl ether, hydroquinone monobutyl ether, TEMPO, 4-hydroxy-TEMPO, TEMPOL, cupferron A1, IRGASTAB UV-10, IRGASTAB UV-22, FIRSTCURE ST-1 (manufactured by ALBEMARLE), t-butylcatechol, pyrogallol, TINUVIN 111 FDL, TINUVIN 144, TINUVIN 292, TINUVIN XP40, TINUVIN XP60 and TINUVIN 400 which are manufactured by BASF. These compounds may be used singly, or two or more of them may be used in combination.

In the case where the model material composition comprises the storage stabilizer, the content of the storage stabilizer is preferably 0.05 to 3% by mass, with respect to the total mass of the model material composition, from the viewpoint that the above-mentioned effects are likely to be achieved.

<Coloring Agent>

The model material composition of the present invention may additionally comprise a coloring agent. In the case where the model material composition of the present invention is a colorless transparent clear composition which is colorless and transparent, the model material composition comprises no coloring agent.

The coloring agent is not particularly limited, and is preferably a pigment capable of being dispersed uniformly in a water-insoluble medium or a dye capable of being dissolved in a water-insoluble medium, since the model material composition of the present invention is a nonaqueous system.

As the pigment, both of an inorganic pigment and an organic pigment can be used. Examples of the inorganic pigment include titanium oxide, zinc flower, zinc oxide, lithopone, iron oxide, aluminum oxide, silicon dioxide, kaolinite, montmorillonite, talc, barium sulfate, calcium carbonate, silica, alumina, cadmium red, colcothar, molybdenum red, chromium vermilion, molybdate orange, chrome yellow, chromium yellow, cadmium yellow, yellow iron oxide, titanium yellow, chromium oxide, viridian, cobalt green, titanium cobalt green, cobalt chromium green, ultramarine, ultramarine blue, iron blue, cobalt blue, cerulean blue, manganese violet, cobalt violet and mica. Examples of the organic pigment include an azo-type organic pigment, an azomethine-type organic pigment, a polyazo-type organic pigment, a phthalocyanine-type organic pigment, a quinacridone-type organic pigment, an anthraquinone-type organic pigment, an indigo-type organic pigment, a thioindigo-type organic pigment, a quinophthalone-type organic pigment, a benzimidazolone-type organic pigment and an isoindoline-type organic pigment. Carbon black made from acidic, neutral or basic carbon may also be used. Hollow particles of a crosslinked acrylic resin or the like may also be used as the organic pigment.

In the model material composition of the present invention, pigments respectively having a black color and three primary colors, i.e., cyan, magenta and yellow, are generally used. In addition, a pigment having another color hue, a metallic luster pigment such as gold and silver, a colorless or pale extender pigment and the like may also be used depending on the intended use.

The coloring agents may be used singly, or two or more of them may be used in the form of a mixture. In the present invention, two or more of the organic pigments or solid solutions of the organic pigment may be used in combination. Different coloring agents may be used or a single type of coloring agent may be used, for different dripped droplets or liquids.

For the dispersion of the coloring agent, a dispersing device such as a bead mill, a ball mill, a sand mill, an attritor, a roll mill, a jet mill, a homogenizer, a paint shaker, a kneader, an agitator, a Henschel mixer, a colloid mixer, an ultrasonic homogenizer, a pearl mill and a wet-mode jet mill may be used. In addition, a mixing machine such as a line mixer may be used. After the dispersion of the coloring agent, a sieving treatment may be further carried out using a centrifugal machine, a filter, a cross-flow or the like for the purpose of removing coarse particles of the coloring agent.

For the dispersion of the coloring agent, a dispersant may be used. The dispersant is not particularly limited, but it is preferred that a known polymer dispersant is used.

The content of the dispersant may be selected appropriately depending on the intended use, and is, for example, 0.01 to 5% by mass, with respect to the total mass of the model material composition.

In the addition of the coloring agent, a synergist suitable for the coloring agent may be used as a dispersion aid, if necessary.

The content of the coloring agent may be selected appropriately depending on the intended color and the intended use, and is preferably 0.05 to 30% by mass, more preferably 0.1 to 10% by mass, with respect to the total mass of the model material composition from the viewpoint of the density of an image and storage stability.

When the model material composition of the present invention drips and lands on a cured article of the model material composition, the contact angle of a droplet of the model material composition against the cured article as measured 0.3 seconds after the landing (hereinafter, the contact angle is also referred to as a "contact angle MM",) is preferably 40° or more, more preferably 41° or more, still more preferably 42° or more, particularly preferably 43° or more. The term "contact angle" as used herein refers to an angle formed between the surface of a droplet and the surface of a solid at a part where the droplet is in contact with the surface of the solid, and is an index indicating the degree of the so-called "wettability" of the droplet. The reason why the point of time of measuring the contact angle is set to 0.3 seconds after the landing of the composition (droplet) onto the cured article (solid surface) is that the time meets to a standard time required until the composition is cured by the irradiation with an energy ray after the landing of the composition. When the contact angle MM of the model material composition is equal to or more than the lower limit, it is possible to prevent the occurrence of excessive wetting and spreading between a cured article of the model material composition that is applied previously and the model material composition that will form a next layer that overlays on the cured article, and thus, strain or displacement is less likely to occur. In addition, the recovery ability in the case where strain or displacement occurs may be improved, and it is possible to laminate the model material composition with high accuracy in the vertical direction, even when the model material composition is ejected continuously through a material jetting nozzle. Therefore, it is possible to secure high shaping accuracy in high-speed shaping. The upper limit of the contact angle MM of the model material composition is not particularly limited, but is generally 60° or less, and is preferably 54° or less from the viewpoint the achievement of both of high shaping accuracy and excellent mechanical properties.

In the present invention, the contact angle MM of the model material composition can be controlled by adjusting the kinds of the above-mentioned siloxane compound having one polymerizable group per molecule and the amount of the siloxane compound to be added. For example, the contact angle MM may increase by controlling the number average molecular weight of the siloxane compound to 300 to 10,000 or by adding the siloxane compound in an amount of 0.005 to 5.0% by mass with respect to the total mass of the model material composition. The term "contact angle MM" in the present invention refers to a contact angle formed between a droplet of the model material composition and a cured article of a droplet of the model material composition, and the method for measuring the contact angle MM will be described in the section "EXAMPLES" mentioned below.

The surface tension of the model material composition of the present invention is preferably 24 to 30 mN/m, more preferably 24.5 mN/m or more, still more preferably 25 mN/m or more, and is more preferably 29.5 mN/m or less, still more preferably 29 mN/m or less. When the surface tension falls within the above-mentioned range, a droplet can be formed normally through a nozzle even in material jetting high-speed ejection, and it is possible to secure a proper droplet amount or proper landing accuracy and to prevent the formation of satellites. Therefore, shaping accuracy can be improved more easily.

In the present invention, the surface tension of the model material composition can be generally controlled by adjusting the kinds of the above-mentioned siloxane compound having one polymerizable group per molecule or the amount of the siloxane compound to be added. The surface tension may be controlled by adding a siloxane compound that is different from the siloxane compound having one polymerizable group per molecule or a surface modifier that is different from the siloxane compound (e.g., a fluorine-containing surface modifier), as long as the effects of the present invention cannot be interfered. The surface tension of the model material composition can be measured by a method described in the section "EXAMPLES".

The viscosity of the model material composition of the present invention is preferably 3 to 70 mPa·s, more preferably 5 to 60 mPa·s, at 25° C., from the viewpoint of the achievement of good ejectability of the model material composition through a material jetting nozzle. The viscosity can be measured in accordance with JIS Z 8803 using a R100-model viscometer. The viscosity of the model material composition can be controlled by adjusting the kinds and the addition ratio of the polymerizable compounds, the kinds and the amounts of the diluting solvent and the thickening agent, and the like.

The method for producing the model material composition of the present invention is not particularly limited. For example, the model material composition can be produced by mixing the components constituting the model material composition homogeneously using a mixing/stirring device or the like.

<Composition Set for Material Jetting Optical Shaping>

The model material composition of the present invention has excellent shaping accuracy in high-speed shaping, and can be laminated with high accuracy in the height-direction even when the model material composition is ejected continuously through a material jetting nozzle. Therefore, a three-dimensional structure can be shaped using only the model material composition. However, when the model material composition is combined with a support material for supporting a model material during three-dimensional shaping, a complicated shape or a delicate shape can be formed with higher accuracy. Accordingly, another subject matter of the present invention is a composition set for material jetting optical shaping, comprising the model material composition of the present invention and a support material composition for shaping a support material by a material jetting optical shaping method.

<Support Material Composition>

The support material composition is a photocurable support material composition, which can provide a support material by photocuring. After the production of the model material, the support material can be removed from the model material by physically detaching the support material from the model material or by dissolving the support material in an organic solvent or water. The model material composition of the present invention can be used in combination with various compositions that are conventionally known as support material compositions. From the viewpoint that the model material cannot be damaged during the removal of the support material, the support material is made environment-friendly and the support material can be removed completely and easily in delicate parts, the support material composition that constitutes the composition set for optical shaping of the present invention is preferably soluble in water.

The water-soluble support material composition preferably comprises a water-soluble monofunctional ethylenically unsaturated monomer, a water-soluble resin and a photopolymerization initiator. More specifically, in order to form a support material having both of excellent removability with water and excellent supporting force, in the support material composition, it is preferred that the water-soluble monofunctional ethylenically unsaturated monomer comprises a (meth)acrylamide derivative, and that the water-soluble resin comprises at least one group selected from the group consisting of an oxyethylene group, an oxypropylene group and an oxytetramethylene group, and that the photopolymerization initiator comprises an acylphosphine oxide-type photopolymerization initiator.

Examples of the water-soluble monofunctional ethylenically unsaturated monomer contained in the support material composition include a hydroxyl group-containing (meth) acrylate having 5 to 15 carbon atoms [e.g., hydroxyethyl (meth)acrylate, hydroxypropyl (meth)acrylate, 4-hydroxybutyl (meth)acrylate], a hydroxyl group-containing (meth) acrylate having a number average molecular weight (Mn) of 200 to 1,000 [e.g., polyethylene glycol mono(meth)acrylate, a monoalkoxy (C1 to C4) polyethylene glycol mono(meth) acrylate, polypropylene glycol mono(meth)acrylate, a monoalkoxy (C1 to C4) polypropylene glycol mono(meth) acrylate, a mono(meth)acrylate of a PEG-PPG block polymer], a (meth)acrylamide derivative having 3 to 15 carbon atoms [e.g., (meth)acrylamide, N-methyl(meth)acrylamide, N-ethyl(meth)acrylamide, N-propyl(meth)acrylamide, N-butyl(meth)acrylamide, N,N'-dimethyl(meth)acrylamide, N,N'-diethyl(meth)acrylamide, N-hydroxyethyl(meth)acrylamide, N-hydroxypropyl(meth)acrylamide, N-hydroxybutyl (meth)acrylamide], and (meth)acryloylmorpholine. These compounds may be used singly, or two or more of them may be used in combination.

The content of the water-soluble monofunctional ethylenically unsaturated monomer to be contained in the support material composition is preferably 19 to 80% by mass per 100% by mass, i.e., the total mass, of the support material composition. When the content falls within the above-mentioned range, the removability with water can be improved without deteriorating the supporting force of the support material.

The water-soluble resin contained in the support material composition can impart a proper level of hydrophilicity to the support material. When the water-soluble resin is added, it is possible to produce a support material having both of removability with water and a supporting force. The water-soluble resin preferably comprises at least one group selected from the group consisting of an oxyethylene group, an oxypropylene group and an oxytetramethylene group. This is because the removability with water can be further improved without deteriorating the supporting force of the support material. A specific example of the water-soluble resin is a polyoxyalkylene glycol containing at least one group selected from the group consisting of an oxyethylene group, an oxypropylene group and an oxytetramethylene group, such as polyethylene glycol, polypropylene glycol, poly(oxy tetramethylene) glycol, polyoxytetramethylene polyoxyethylene glycol and polyoxytetramethylene polyoxypropylene glycol. The water-soluble resin may be used singly, or two or more thereof may be used in combination.

The content of the water-soluble resin in the support material composition of the present invention is preferably 15 to 75% by mass inclusive per 100% by mass, i.e., the total mass, of the support material composition. When the content falls within the above-mentioned range, the removability with water can be improved without deteriorating the supporting force of the support material.

The number average molecular weight Mn of the water-soluble resin is preferably 100 to 5,000. When the Mn of the water-soluble resin falls within the above-mentioned range, the water-soluble resin can compatibilize with the water-soluble resin that is not photocured yet and cannot compatibilize with the water-soluble resin that has been photocured. As a result, it is possible to improve the self-standing ability of a support material obtained by the photocuring of the support material composition, and to improve the solubility of the support material in water. The number average molecular weight Mn of the water-soluble resin is preferably 200 to 3,000, more preferably 400 to 2,000.

If necessary, the support material composition may comprise the other additives. Examples of the "other additive" include a photopolymerization initiator, a water-soluble organic solvent, an antioxidant agent, a coloring agent, a pigment dispersant, a storage stabilizer, an ultraviolet ray absorber, a light stabilizer, a polymerization inhibitor, a chain transfer agent and a filler.

As the photopolymerization initiator, the compounds mentioned above as the examples of the photopolymerization initiator which the model material composition comprises may be used. From the viewpoint of excellent curability with an LED light source and the reduction in discoloration of a shaped article, it is preferred to use an acylphosphine oxide-type photopolymerization initiator. In the case where the support material composition comprises the photopolymerization initiator, the content of the photopolymerization initiator is preferably 2 to 20% by mass, more preferably 3 to 10% by mass, with respect to the total mass of the support material composition. When the content of the photopolymerization initiator is equal to or more than the lower limit, it is possible to reduce the amount of an unreacted polymerization component sufficiently and to improve the curability of the support material satisfactorily. When the content of the photopolymerization initiator is equal to or less than the upper limit, it becomes easy to avoid the remaining of the unreacted photopolymerization initiator in the support material.

The water-soluble organic solvent is a component capable of improving the solubility of the support material obtained by the photocuring of the support material composition in water. The water-soluble organic solvent is also a component capable of adjusting the viscosity of the support material composition to a lower value. In the case where the support material composition comprises the water-soluble organic solvent, the content of the water-soluble organic solvent is preferably 35% by mass or less, more preferably 30% by mass or less, with respect to the total mass of the support material composition. The content is also preferably 3% by mass or more, more preferably 5% by mass or more, still more preferably 10% by mass or more. If the amount of the water-soluble organic solvent in the support material composition is too large, bleeding of the water-soluble organic solvent may occur during the photocuring of the support material composition, and therefore the dimensional accuracy of a model material formed as an upper layer on the support material may be deteriorated. When the content of the water-soluble organic solvent is equal to or less than the upper limit, the bleeding may be prevented. When the content of the water-soluble organic solvent in the support material composition is equal to or more than the lower limit, the solubility of the support material in water may be improved and the viscosity of the support material composition may be adjusted to a lower value.

Examples of the water-soluble organic solvent include an alkylene glycol monoacetate having a linear or branched alkylene group [e.g., ethylene glycol monoacetate, propylene glycol monoacetate, diethylene glycol monoacetate, dipropylene glycol monoacetate, triethylene glycol monoacetate, tripropylene glycol monoacetate, tetraethylene glycol monoacetate, tetrapropylene glycol monoacetate], an alkylene glycol monoalkyl ether having a linear or branched alkylene group [e.g., ethylene glycol monomethyl ether, propylene glycol monomethyl ether, diethylene glycol monomethyl ether, dipropylene glycol monomethyl ether, triethylene glycol monomethyl ether, tripropylene glycol monomethyl ether, tetraethylene glycol monomethyl ether, tetrapropylene glycol monomethyl ether, ethylene glycol monoethyl ether, propylene glycol monoethyl ether, diethylene glycol monoethyl ether, dipropylene glycol monoethyl ether, triethylene glycol monoethyl ether, tripropylene glycol monoethyl ether, tetraethylene glycol monoethyl ether, tetrapropylene glycol monoethyl ether, ethylene glycol monopropyl ether, propylene glycol monopropyl ether, diethylene glycol monopropyl ether, dipropylene glycol monopropyl ether, triethylene glycol monopropyl ether, tripropylene glycol monopropyl ether, tetraethylene glycol monopropyl ether, tetrapropylene glycol monopropyl ether, ethylene glycol monobutyl ether, propylene glycol monobutyl ether, diethylene glycol monobutyl ether, dipropylene glycol monobutyl ether, triethylene glycol monobutyl ether, tripropylene glycol monobutyl ether, tetraethylene glycol monobutyl ether, tetrapropylene glycol monobutyl ether], an alkylene glycol diacetate having a linear or branched alkylene group [e.g., ethylene glycol diacetate, propylene glycol diacetate, diethylene glycol diacetate, dipropylene glycol diacetate, triethylene glycol diacetate, tripropylene glycol diacetate, tetraethylene glycol diacetate, tetrapropylene glycol diacetate], an alkylene glycol dialkyl ether having a linear or branched alkylene group [e.g., ethylene glycol dimethyl ether, propylene glycol dimethyl ether, diethylene glycol dimethyl ether, dipropylene glycol dimethyl ether, triethylene glycol dimethyl ether, tripropylene glycol dimethyl ether, tetraethylene glycol dimethyl ether, tetrapropylene glycol dimethyl ether, ethylene glycol diethyl ether, propylene glycol diethyl ether, diethylene glycol diethyl ether, dipropylene glycol diethyl ether, triethylene glycol diethyl ether, tripropylene glycol diethyl ether, tetraethylene glycol diethyl ether, tetrapropylene glycol diethyl ether, ethylene glycol dipropyl ether, propylene glycol dipropyl ether, diethylene glycol dipropyl ether, dipropylene glycol dipropyl ether, triethylene glycol dipropyl ether, tripropylene glycol dipropyl ether, tetraethylene glycol dipropyl ether, tetrapropylene glycol dipropyl ether, ethylene glycol dibutyl ether, propylene glycol dibutyl ether, diethylene glycol dibutyl ether, dipropylene glycol dibutyl ether, triethylene glycol dibutyl ether, tripropylene glycol dibutyl ether, tetraethylene glycol dibutyl ether, tetrapropylene glycol dibutyl ether], and an alkylene glycol monoalkyl ether acetate having a linear or branched alkylene group [e.g., ethylene glycol monomethyl ether acetate, propylene glycol monomethyl ether acetate, diethylene glycol monomethyl ether acetate, dipropylene glycol monomethyl ether acetate, triethylene glycol monomethyl ether acetate, tripropylene glycol monomethyl ether acetate, tetraethylene glycol monomethyl ether acetate, tetrapropylene glycol monomethyl ether acetate, ethylene glycol monoethyl ether acetate, propylene glycol monoethyl ether acetate, diethylene glycol monoethyl ether acetate, dipropylene glycol monoethyl ether acetate, triethylene glycol monoethyl ether acetate, tripropylene glycol monoethyl ether acetate, tetraethylene glycol monoethyl ether acetate, tetrapropylene glycol monoethyl ether acetate, ethylene glycol monopropyl ether acetate, propylene glycol monopropyl ether acetate, diethylene glycol monopropyl ether acetate, dipropylene glycol monopropyl ether acetate, triethylene glycol monopropyl ether acetate, tripropylene glycol monopropyl ether acetate, tetraethylene glycol monopropyl ether acetate, tetrapropylene glycol monopropyl ether acetate, ethylene glycol monobutyl ether acetate, propylene glycol monobutyl ether acetate, diethylene glycol monobutyl ether acetate, dipropylene glycol monobutyl ether acetate, triethylene glycol monobutyl ether acetate, tripropylene glycol monobutyl ether acetate, tetraethylene glycol monobutyl ether acetate, tetrapropylene glycol monobutyl ether acetate]. These compounds may be used singly, or two or more of them may be used in combination. Among these compounds, the water-soluble organic solvent is more preferably triethylene glycol monomethyl ether or dipropylene glycol monomethyl ether acetate, from the viewpoint of improving the solubility of the obtained support material in water and adjusting the viscosity of the support material composition to a lower value.

From the viewpoint of the achievement of good ejectability of the support material composition through a material jetting nozzle, the viscosity of the support material composition of the present invention is preferably 3 to 70 mPa·s, more preferably 5 to 60 mPa·s, at 25° C. The viscosity can be measured in accordance with JIS Z 8 803 using a R100-model viscometer.

The method for producing the support material composition of the present invention is not particularly limited. For example, the support material composition can be produced by mixing the components constituting the support material composition homogeneously using a mixing/stirring device or the like.

<Method for Producing Optically Shaped Article>

The present invention also provides a method for producing an optically shaped article, in which a three-dimensionally shaped article is produced by a material jetting-mode optical shaping method using the composition set for optical shaping of the present invention. In the production method of the present invention, a three-dimensionally shaping system comprising at least a personal computer and a three-dimensional shaping device connected to the personal computer may be used.

The method for producing an optically shaped article of the present invention is not particularly limited, as long as the method is a method for producing a three-dimensionally shaped article by a material jetting-mode optical shaping method using the composition set for optical shaping of the present invention. In one preferred embodiment of the present invention, the production method of the present invention comprises the steps of: (I) photocuring the model material composition to obtain a model material and, at the same time, photocuring the support material composition to obtain a support material; and (II) removing the support material from the model material. The steps (I) and (II) are not particularly limited, but may be carried out, for example, in the following manner.

<Step (I)>

FIG. 1 is a diagram schematically illustrating the step (I) in the method for producing an optically shaped article according to the present embodiment. As illustrated in FIG. 1, a three-dimensional shaping device 1 is equipped with a material jetting head module 2 and a shaping table 3. The material jetting head module 2 is equipped with: a material jetting head 7 for model materials in which the model material composition 4' is filled; a material jetting head 8 for support materials in which the support material composition 5' is filled; a roller 9; and a light source 10.

Firstly, the material jetting head module 2 is scanned in the X direction and the Y direction relative to the shaping table 3 shown in FIG. 1, the model material composition 4' is ejected through the material jetting head 7 for model materials, and at the same time the support material composition 5' is ejected through the material jetting head 8 for model materials. In this manner, a resin composition layer comprising the model material composition 4' and the support material composition 5' is formed. In order to make the upper surface of the resin composition layer smooth, excessive portions of the model material composition and the support material composition are removed using the roller 9. Subsequently, the resin composition layer comprising the model material composition 4' and the support material composition 5' is irradiated with light using the light source 10 to form a cured layer comprising the model material 4 and the support material 5 on the shaping table 3.

Subsequently, the shaping table 3 is let down by the thickness of the cured layer in the Z direction shown in FIG. 1. Subsequently, a cured layer comprising the model material 4 and the support material 5 is further formed on the above-formed cured layer in the same manner as mentioned above. By repeatedly performing these steps, a cured article 6 comprising the model material 4 and the support material 5 is produced.

Examples of the light to be employed for the curing of the model material composition and the support material composition include active energy rays such as far-infrared ray, infrared ray, visible ray, near-ultraviolet ray, ultraviolet ray, an electron ray, a ray, y ray and X ray. Among these energy active rays, near-ultraviolet ray or ultraviolet ray is preferred from the viewpoint of the easiness and efficiency of curing operations.

Examples of the light source 10 include a lamp-type light source and an LED-type light source. Among these light sources, an LED-type light source is preferred from the viewpoint of miniaturization of facility and consumed electric power saving.

In one preferred embodiment of the present invention, the curing of the model material composition can be carried out by irradiating with an active energy ray having an accumulated light amount of 300 mJ/cm$^2$ or more per layer in a wavelength region of 320 to 410 nm. By irradiating with an active energy ray having a high accumulated light amount in a wavelength region of 320 to 410 nm, the crosslinking reaction of a component having a polymerizable group (e.g., an acryloyl group) that has a relatively high reaction velocity can be accelerated. Therefore, it is considered that, for example when a polymerizable compound having an acryloyl group as the polymerizable group is used and a siloxane compound having a polymerizable group having a slower reaction velocity than that of an acryloyl group (e.g., a methacryloyl group) is used, the crosslinking reaction of the polymerizable compound can be accelerated firstly and the crosslinking of the siloxane compound is delayed during the time period between the landing of the model material composition ejected through the material jetting nozzle and the curing of the model material composition, and consequently a time period for aligning the siloxane compound on the outermost surface of a droplet of the model material composition can be provided, and the shaping accuracy of the model material composition can be improved. In the present invention, the accumulated light amount is more preferably 300 mJ/cm² or more, still more preferably 500 mJ/cm² or more. The upper limit of the peak irradiance is not particularly limited, and is generally 2,000 mJ/cm² or less from the viewpoint of the amount of saved energy and the prevention of the damage of the base material.

<Step (II)>

Figure 2:
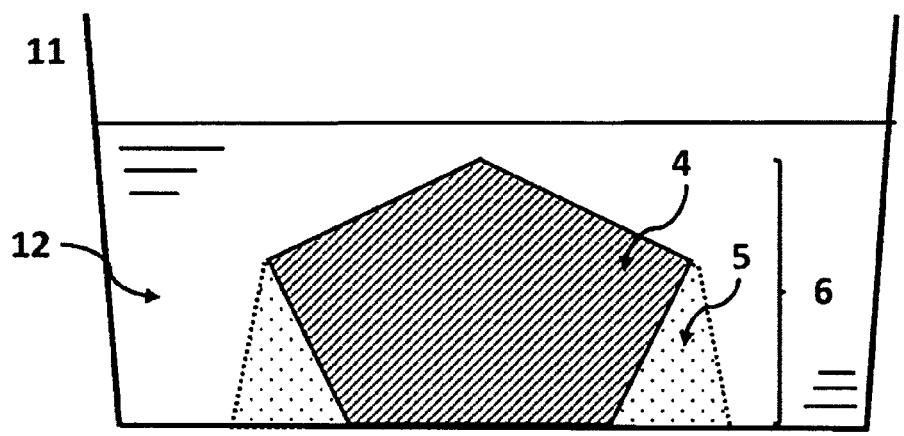
FIG. 2 is a diagram schematically illustrating a step (II) in one embodiment of the method for producing an optically shaped article according to the present invention.

FIG. 2 is a diagram schematically illustrating the step (II) in the method for producing an optically shaped article according to the present embodiment. In step (II), the cured article 6 produced in step (I) which comprises the model material 4 and the support material 5 is immersed in a solvent 12 contained in a container 11. In this manner, the support material 5 can be dissolved in the solvent 12 and removed.

Examples of the solvent 12 for dissolving the support material include ion exchange eater, distilled water, tap water and well water. Among these solvents, ion exchange water is preferred from the viewpoint of containing impurities in a relatively small amount and of being available at low cost.

Through the above-mentioned steps, an optically shaped article such as a three-dimensional article can be produced by the photocuring of the model material composition.

Examples

Hereinbelow, the present invention will be described in more detail with reference to examples. In the following examples, "%" and "parts" are % by mass and parts by mass, respectively, unless otherwise specified.

1. Model Material Composition

The details and abbreviations for the components constituting a model material composition used in each of Examples and Comparative Examples are shown in Tables 1 to 4.

In Table 1, the SP value of each of the monofunctional ethylenically unsaturated copolymers (A) and the polyfunctional ethylenically unsaturated monomers (B) refers to a value determined at 25° C. by a Fedors method ("Basic science of coating", edited by Yuji Harasaki, Chapter 3, page 35. 1977, published by Maki Shobo), and is a value calculated in accordance with the following method.

Fedors considered that both of a coagulation energy density and a molar volume depend on the types and number of substituents, and has proposed an equation shown below and a constant corresponding to each of the functional groups.

$$\delta = (\Delta E/V)^{1/2} = (\Sigma \Delta ei / \Sigma \Delta vi)^{1/2}$$

In the equation, $\delta$ represents an SP value $(cal/cm^3)^{1/2}$, $\Delta E$ represents a coagulation energy density, V represents a molar volume, $\Delta ei$ represents an evaporation energy (cal/mol) of each atom or each atomic group, and $\Delta vi$ represents a molar volume $(cm^3/mol)$ of each atom or each atomic group.

With respect to a compound having a Tg of 25° C. or higher, the following numerical value is added to the molar volume. The number of atoms in the main chain backbone in a repeating unit of a compound is represented by n. When n<3, 4n is added to $\Delta vi$; and when n≥3, 2n is added to $\Delta vi$.

TABLE 2

| Oligomer (C) | | | |
|---|---|---|---|
| Component Name | Abbreviation | Product Name | Specification Number of functional groups |
| Aliphatic urethane acrylate | EB8402 | manufactured by Daicel-Allnex Ltd., EBECRYL8402 | 2 |
| Urethane acrylate | CN991 | manufactured by Arkema, Sartomer CN991 | 2 |

TABLE 1

| | Component Name | Abbreviation | Product Name | Specification Number of functional groups | SP value $(cal/cm^3)^{1/2}$ | Tg (° C.) |
|---|---|---|---|---|---|---|
| Monofunctional ethylenically unsaturated monomer (A) | Isobornyl acrylate | IBOA | manufactured by Arkema, SR506 | 1 | 9.3 | 88 |
| | Tetrahydrofurfuryl acrylate | THFA | manufactured by Arkema, SR285 | 1 | 9.5 | −15 |
| | Phenoxyethyl acrylate | PEA | manufactured by Arkema, SR339 | 1 | 10.1 | 5 |
| | N-Vinylcaprolactam | NVCL | manufactured by Ashland, V-Cap | 1 | 10.8 | 90 |
| | Acryloylmorpholine | ACMO | manufactured by KJ Chemicals Corporation, ACMO | 1 | 11.2 | 145 |
| Polyfunctional ethylenically unsaturated monomer (B) | 1,6-Hexanediol diacrylate | HDDA | manufactured by Arkema, SR238 | 2 | 9.6 | 43 |
| | Tricyclodecane dimethanol diacrylate | TCDDA | manufactured by Arkema, SR833 | 2 | 10.2 | 190 |
| | Dipropylene glycol diacrylate | DPGDA | manufactured by Arkema, SR508 | 2 | 9.3 | 104 |
| | Tripropylene glycol diacrylate | TPGDA | manufactured by Arkema, SR306 | 2 | 9.2 | 62 |
| | Glycerin propoxy triacrylate | OTA480 | manufactured by Daicel-Allnex Ltd., OTA480 | 3 | 9.8 | 96 |
| | Aminoacrylate | EB7100 | manufactured by Daicel-Allnex Ltd., EBECRYL7100 | 2 | 11.0 | −25 |

TABLE 3

Siloxane compound

| | Abbreviation | Component Name/Product Name | Specification Functional group | Number average molecular weight |
|---|---|---|---|---|
| Siloxane compound having one polymerizable group per molecule | SILQUESTA-174 | 3-Methacryloylpropyltrimethoxysilane | Single-end-type methacryloyl group | 248 |
| | X-22-174ASX | Methacryloyl group-modified polydimethylsiloxane | Single-end-type methacryloyl group | 900 |
| | X-22-174BX | Methacryloyl group-modified polydimethylsiloxane | Single-end-type methacryloyl group | 2,300 |
| | X-24-8201 | Methacryloyl group-modified polydimethylsiloxane | Single-end-type methacryloyl group | 2,730 |
| | X-22-174DX | Methacryloyl group-modified polydimethylsiloxane | Single-end-type methacryloyl group | 4,600 |
| | X-22-2426 | Methacryloyl group-modified polydimethylsiloxane | Single-end-type methacryloyl group | 12,000 |
| Other siloxane compound | BYK307 | Polyether-modified polydimethylsiloxane | having no reactive group | |
| | BYK3500 | Acryloyl group-modified polydimethylsiloxane | Both-end-type acryloyl group, difunctional | 3,150 |
| | TEGO-Rad2100 | Acryloyl group-modified polydimethylsiloxane | Side-chain-type acryloyl group, pentafunctional | |

TABLE 4

| | Name/type of component | Abbreviation | Name/specification of product |
|---|---|---|---|
| Photopoly-merization initiator | 2,4,6-Trimethylbenzoyl-diphenyl-phosphine oxide | TPO | manufactured by BASF, DAROCURE TPO |
| | 1-Hydroxycyclohexylphenyl | 184 | manufactured by BASF, IRGACURE184 |
| Storage stabilizer | 4-Hydroxy-2,2,6,6-tetramethyl-piperidine-n-oxyl | H-TEMPO | manufactured by Evonik Degussa Japan Co., Ltd., HYDROXY-TEMPO |
| Coloring agent | Acidic carbon black pigment | MA-8 | manufactured by Mitsubishi Chemical Corporation, MA-8 |
| | Titanium oxide pigment | CR-60 | manufactured by Ishihara Sangyo, Ltd., CR-60 |
| Pigment dispersant | Comb-shaped copolymer having basic functional group | Sol.32000 | manufactured by Lubrizol Japan, Solsperse32000 |
| Dispersion aid | Synergist | Sol.5000 | manufactured by Lubrizol Japan, Solsperse5000 |

(1) Preparation of Model Material Composition

Components constituting each of compositions for model materials were mixed homogeneously using a mixing/stirring device in accordance with the compositions shown in Table 5, and the resultant mixture was filtrated by sucking using a glass filter (manufactured by Kiriyama glass. CO.). In this manner, model material compositions 1 to 6 of Examples 1 to 6 and model material compositions C1 to C7 of Comparative Examples 1 to 7 were produced.

In each of Examples 7 and 8, a coloring material, a dispersant, a dispersion aid and a storage stabilizer shown in Table 4 and IBOA shown as a dispersion solvent in Table 1 were weighed in a 250-ml plastic-made bottle at a blend ratio shown in Table 5 so that the total amount of the components became 65 parts by weight, then 250 parts by weight of zirconia beads each having a diameter of 0.3 mm were added to the mixture. After that, the resultant mixture was subjected to a dispersion treatment for two hours with a paint conditioner (manufactured by Toyo Seiki Seisaku-sho, Ltd.) to obtain a pigment dispersion. Subsequently, materials other than the coloring agent, the dispersant, the dispersion aid, the storage stabilizer and IBOA were added at a blend ratio shown in Table 5 in an amount of 49.5 parts by weight to 50.5 parts by weight of the pigment dispersion. Then, the resultant mixture was mixed homogeneously using a mixing/stirring device, and then the resultant mixture was filtrated by suction using a glass filter (manufactured by Kiriyama glass. CO.). In this manner, model material compositions 7 and 8 of Examples 7 and 8 were prepared.

(1) Physical Properties of Model Material Composition

The viscosity and surface tension of each of the model material compositions prepared in Examples 1 to 8 and Comparative Examples 1 to 7 were measured by the following methods. The results are shown in Table 5.

<Measurement of Viscosity>

The viscosity of each of the model material compositions was measured using an R100-model viscometer (manufactured by Toki Sangyo Co., Ltd.) under the conditions of 25° C. and a corn rotation number of 5 rpm.

<Measurement of Surface Tension>

The surface tension of each of the model material compositions was measured at 25° C. 20 seconds after the start of the measurement using an automatic balance type electro surface tension meter ESB-V (manufactured by Kyowa Interface Science Co., Ltd.).

TABLE 5

| Component | | Abbreviate | Component composition (% by mass) Example |||||||| |
|---|---|---|---|---|---|---|---|---|---|---|
| | | | 1 | 2 | 3 | 4 | 5 | 6 | 7 | 8 |
| Polymerizable compound | Monofunctional ethylenically unsaturated monomer (A) | IBOA | 65.83 | 40.88 | 55.80 | 54.80 | 69.80 | 40.85 | 49.91 | 49.09 |
| | | THFA | — | — | — | — | — | — | — | — |
| | | PEA | — | 25.00 | — | — | — | — | — | — |
| | | NVCL | — | — | — | — | — | — | 5.00 | 5.00 |
| | | ACMO | — | — | — | — | — | 20.00 | — | — |
| | Polyfunctional ethylenically unsaturated monomer (B) | HDDA | — | — | — | — | — | — | — | — |
| | | TCDDA | — | — | — | — | — | — | — | — |
| | | DPGDA | — | — | 20.00 | — | — | 20.00 | — | — |
| | | TPGDA | — | — | — | 20.00 | — | — | 19.70 | 19.70 |
| | | OTA480 | 15.00 | 15.00 | — | — | — | — | — | — |
| | | EB7100 | — | — | — | 3.00 | 5.00 | — | 3.00 | 3.00 |
| | Oligomer © | EB8402 | — | — | 20.00 | — | 20.00 | — | 17.70 | 17.70 |
| | | CN991 | 15.00 | 15.00 | — | 18.00 | — | 15.00 | — | — |
| | Photopolymerization initiator | TPO | 4.00 | 4.00 | 4.00 | 4.00 | 3.00 | 4.00 | 4.00 | 4.00 |
| | | 184 | — | — | — | — | 2.00 | — | — | — |
| Siloxane compound | Siloxane compound having one polymerizable group per molecule | SILQUESTA-174 | — | — | — | — | — | — | — | — |
| | | X-22-174ASX | — | — | — | 0.10 | — | — | — | — |
| | | X-22-174BX | — | — | — | — | — | — | 0.10 | 0.10 |
| | | X-24-8201 | — | — | 0.10 | — | 0.10 | 0.05 | — | — |
| | | X-22-174DX | 0.07 | 0.02 | — | — | — | — | — | — |
| | | X-22-2426 | — | — | — | — | — | — | — | — |
| | Other siloxane compound | BYK307 | — | — | — | — | — | — | — | — |
| | | BYK3500 | — | — | — | — | — | — | — | — |
| | | TEGO-Rad2100 | — | — | — | — | — | — | — | — |
| Storage stabilizer | | H-TEMPO | 0.10 | 0.10 | 0.10 | 0.10 | 0.10 | 0.10 | 0.20 | 0.20 |
| Coloring agent | | MA-8 | — | — | — | — | — | — | 0.25 | — |
| | | CR-60 | — | — | — | — | — | — | — | 1.10 |
| Pigment dispersant | | Sol.32000 | — | — | — | — | — | — | 0.13 | 0.11 |
| Dispersion aid | | Sol.5000 | — | — | — | — | — | — | 0.01 | — |
| Total | | | 100.00 | 100.00 | 100.00 | 100.00 | 100.00 | 100.00 | 100.00 | 100.00 |
| Physical properties of ink composition for model material |||||||||||
| Viscosity (mPas) | | | 29.3 | 30.0 | 31.5 | 28.0 | 44.0 | 23.9 | 34.8 | 34.9 |
| Surface tension (mN/m) | | | 24.5 | 25.4 | 26.1 | 29.2 | 26.9 | 26.3 | 26.8 | 26.9 |

| Component | | Abbreviate | Component composition (% by mass) Comparative Example ||||||| |
|---|---|---|---|---|---|---|---|---|---|
| | | | 1 | 2 | 3 | 4 | 5 | 6 | 7 |
| Polymerizable compound | Monofunctional ethylenically unsaturated monomer (A) | IBOA | 55.90 | 40.80 | 40.88 | 69.80 | 45.80 | 35.80 | 55.80 |
| | | THFA | — | — | — | — | 10.00 | 10.00 | — |
| | | PEA | — | — | — | — | — | — | — |
| | | NVCL | — | — | — | — | — | — | — |
| | | ACMO | — | 20.00 | 20.00 | — | — | — | — |
| | Polyfunctional ethylenically unsaturated monomer (B) | HDDA | — | — | — | — | — | 10.00 | — |
| | | TCDDA | — | — | — | — | 20.00 | 20.00 | — |
| | | DPGDA | 20.00 | 20.00 | 20.00 | — | — | — | 20.00 |
| | | TPGDA | — | — | — | — | — | — | — |
| | | OTA480 | — | — | — | — | — | — | — |
| | | EB7100 | — | — | — | 5.00 | — | — | — |
| | Oligomer © | EB8402 | 20.00 | — | — | 20.00 | 20.00 | 20.00 | 20.00 |
| | | CN991 | — | 15.00 | 15.00 | — | — | — | — |
| | Photopolymerization initiator | TPO | 4.00 | 4.00 | 4.00 | 3.00 | 4.00 | 4.00 | 4.00 |
| | | 184 | — | — | — | 2.00 | — | — | — |
| Siloxane compound | Siloxane compound having one polymerizable group per molecule | SILQUESTA-174 | — | — | — | 0.10 | — | — | — |
| | | X-22-174ASX | — | — | — | — | — | — | — |
| | | X-22-174BX | — | — | — | — | — | — | — |
| | | X-24-8201 | — | — | — | — | — | — | — |
| | | X-22-174DX | — | — | — | — | — | — | — |
| | | X-22-2426 | — | — | — | — | 0.10 | 0.10 | — |
| | Other siloxane compound | BYK307 | — | 0.10 | — | — | — | — | — |
| | | BYK3500 | — | — | 0.02 | — | — | — | — |
| | | TEGO-Rad2100 | — | — | — | — | — | — | 0.10 |

TABLE 5-continued

| | | | | | | | | |
|---|---|---|---|---|---|---|---|---|
| Storage stabilizer | H-TEMPO | 0.10 | 0.10 | 0.10 | 0.10 | 0.10 | 0.10 | 0.10 |
| Coloring agent | MA-8 | — | — | — | — | — | — | — |
| | CR-60 | — | — | — | — | — | — | — |
| Pigment dispersant | Sol.32000 | — | — | — | — | — | — | — |
| Dispersion aid | Sol.5000 | — | — | — | — | — | — | — |
| Total | | 100.00 | 100.00 | 100.00 | 100.00 | 100.00 | 100.00 | 100.00 |
| Physical properties of ink composition for model material | | | | | | | | |
| Viscosity (mPas) | | 31.3 | 23.7 | 23.6 | 44.1 | 44.5 | 40.1 | 31.8 |
| Surface tension (mN/m) | | 31.8 | 25.4 | 28.0 | 29.1 | 24.5 | 24.2 | 27.8 |

(3) Evaluation of Physical Properties of Cured Film of Model Material Composition and Shaping Properties of Model Material Composition The physical properties of a coating film of each of the model material compositions for prepared in Examples 1 to 8 and Comparative Examples 1 to 7 and the shaping properties of the each of the model material compositions were evaluated by the following methods. The results are shown in Table 6.

<Wettability (Diameter of Pipetted Droplet)>

The model material composition produced in Example 1 was applied onto a polyethylene terephthalate film having a thickness of 188 μm (a white PET film manufactured by Teijin DuPont Films, product name: "U292W") using a bar coater (#14) to form a printed film having a thickness of 3 μm. The irradiation was carried out using an UV-LED curing device (an aluminum substrate module NSSU100AT manufactured by Nichia Corporation, an LED peak wavelength: 365 nm) as a light source for the curing of the printed film under the condition of an illumination level of 508 mW/cm$^2$ (actually measured using UVR-N1 manufactured by UV Checker GS Yuasa International Ltd.). The printed film was temporality cured, and then a transparent PET film having no UV cut function was attached to the surface of the printed film in order to impart an effect to prevent the inhibition by oxygen. After that, the resultant film was cured by irradiating with ultraviolet ray so that the total accumulated light amount including the light amount used for the temporary curing became 23 mJ/cm$^2$, and then the attached PET film was detached to produce a model material cured film A.

Subsequently, a model material was dripped at a drop volume of 5.0±0.2 μL onto the surface of the model material cured film A using a micropipette. After 20 seconds, the resultant product was cured by irradiating with ultraviolet ray so that the total accumulated light amount became 138 mJ/cm$^2$ using the above-mentioned UV-LED curing device, and then the diameter of the droplet was measured. Each of the measurement values shown in Table 6 was an average value of measurement values that were obtained by carrying out the evaluation three times using the same composition.

The same procedure as in Example 1 was carried out using each of the model material compositions produced in Examples 2 to 8 and Comparative Examples 1 to 7. In this manner, model material cured films B to H and model material cured films I to O were produced.

In Example 9, the model material composition produced in Example 2 was used, and the irradiation was carried out using a high-pressure mercury lamp curing device (ECS-151S Unit, manufactured by Eye Graphics Co., Ltd., a high-pressure mercury lamp H015-L312, a peak wavelength: 365 nm) used in the below-mentioned test on "warpage of shaped article" under the condition of an illumination level of 330 mW/cm$^2$ (actually measured by using UVR-N1 manufactured by UV Checker GS Yuasa International Ltd.), in place of using the UV-LED curing device (an aluminum substrate module NSSU100AT manufactured by Nichia Corporation, an LED peak wavelength: 365 nm) used in the above-mentioned test on "wettability" and employing a total accumulated light amount of 23 mJ/cm$^2$. The resultant printed film was cured by irradiating with ultraviolet ray so that the total accumulated light amount became 570 mJ/cm$^2$ to produce a model material cured film P.

<Contact Angle MM>

Each of the model material compositions that respectively constituted the above-mentioned model material cured films was ejected onto the surface of the corresponding model material cured film at a drop volume of 1.8±0.1 μL, and the contact angle of a drop of the composition was measured 0.3 seconds after the landing of the droplet, using a contact angle measurement device "PG-X" manufactured by MATSUBO Corporation employing a dropping mode as the dynamic mode. In Table 6, the contact angle of a model material composition against a model material cured film was shown as "MM.

<Shaping Accuracy>

Each of the model material compositions produced in Examples 1 to 8 and Comparative Examples 1 to 7 was laminated on a polyethylene terephthalate film having a thickness of 100 μm (a transparent PET film manufactured by Toray Industries, Inc., a product name: "Lumirror QT92") using an inkjet recording device equipped with a piezo-mode inkjet nozzle (DMP-2831 manufactured by FUJIFILM Corporation, Head 10pL model), and the shaping accuracy was evaluated. The head ejection conditions for the inkjet recording device were as follows: voltage: 30 V, frequency: 20 kHz, head temperature: 40° C., and clearance between the head and the PET film: 2 mm. An UV-LED curing device (an aluminum substrate module NVSU119C manufactured by Nichia Corporation, an LED peak wavelength: 375 nm, illumination level: 800 mW/cm²) was set as a light source so as to run side-by-side with the head. The model material composition was cured by irradiating with ultraviolet ray in such a manner that the total accumulated light amount became 43 mJ/cm² 0.4 seconds after the landing of the model material composition onto the PET film or the model material cured film that served as an under layer. With respect to the input date for a shaped article, 100 layers (1 layer is 0.3-mm square) were laminated to produce a square prism. The height of the prism was measured and its shaping accuracy was evaluated in accordance with the criteria shown below. In Example 9, the evaluation was carried out using the model material composition prepared in Example 2 and employing a total accumulated light amount per layer of 430 mJ/cm² in place of 43 mJ/cm².

<Criteria of Evaluation>
Rating ◉: height: 2000 μm or more
Rating ○: height: 1000 to 2000 μm
Rating x: height: less than 1000 μm <Surface Properties of Shaped Article>
The condition of the surface of each of the model material cured films produced in the wettability test above was inspected with naked eyes, and the degree of defects (e.g., pinholes, cissing, digs) was observed. The surface properties of the shaped article was evaluated in accordance with the following criteria.

<Criteria of Evaluation>
Rating ◉: no defect was observed
Rating ○: defects were observed to a small extent
Rating x: many defects were observed <Warpage of Shaped Article>
Each of the model material compositions produced in Examples 1 to 8 and Comparative Examples 1 to 7 was applied onto a polyethylene terephthalate film having a thickness of 75 μm (a transparent PET film manufactured by Toray Industries, Inc., a product name: "Lumirror 75S10") using a bar coater (#36) to form a printed film having a thickness of 8 μm. The irradiation was carried out using a high-pressure mercury lamp curing device (ECS-151S Unit, manufactured by Eye Graphics Co., Ltd., a high-pressure mercury lamp H015-L312, a peak wavelength: 365 nm) under the condition of an illumination level of 330 mW/cm² (actually measured by using UVR-N1 manufactured by UV Checker GS Yuasa International Ltd.). Each of the printed films were cured by irradiating with ultraviolet ray so that the total accumulated light amount became 570 mJ/cm². In this manner, model material cured films for evaluating with respect to the warpage of a shaped article were produced. The level of warpage was checked in accordance with the following criteria.

<Criteria of Evaluation>
Rating ◉: warpage was not observed
Rating ○: a small extent of warpage was observed
Rating x: a large extent of warpage was observed

TABLE 6

|  |  | Example |  |  |  |  |  |  |  |  | Comparative Example |  |  |  |  |  |  |
|---|---|---|---|---|---|---|---|---|---|---|---|---|---|---|---|---|---|
|  |  | 1 | 2 | 3 | 4 | 5 | 6 | 7 | 8 | 9 | 1 | 2 | 3 | 4 | 5 | 6 | 7 |
| Model material composition |  | 1 | 2 | 3 | 4 | 5 | 6 | 7 | 8 | 2 | C1 | C2 | C3 | C4 | C5 | C6 | C7 |
| Model material cured film |  | A | B | C | D | E | F | G | H | P | I | J | K | L | M | N | O |
| Cured film Physical properties | Wettability | 5.7 | 6.3 | 5.8 | 6.2 | 5.4 | 6.1 | 5.6 | 5.7 | 5.5 | 6.5 | 7.0 | 7.4 | 6.5 | 7.0 | 5.5 | 6.5 |
|  | Contact angle MM | 48 | 41 | 47 | 42 | 53 | 43 | 50 | 48 | 51 | 39 | 35 | 32 | 39 | 35 | 39 | 39 |
| Shaping properties | Shaping accuracy | ◉ | ○ | ◉ | ○ | ◉ | ◉ | ◉ | ◉ | ◉ | X | X | X | X | X | X | X |
|  | Surface properties of shaped article | ○ | ○ | ○ | ○ | ◉ | ○ | ◉ | ◉ | ◉ | ○ | ○ | ○ | ○ | X | X | ○ |
|  | Warpage of shaped article | ○ | ○ | ○ | ○ | ◉ | ○ | ○ | ○ | ○ | ○ | ○ | ○ | ○ | ○ | X | ○ |

DESCRIPTION OF REFERENCE SIGNS

1: Three-dimensional shaping device
2: Material jetting head module
3: Shaping table
4: Model material
4': Model material composition
5: Support material
5': Support material composition
6: Cured article
7: Material jetting head for model materials
8: Material jetting head for support materials
9: Roller
10: Light source
11: Container
12: Solvent

The invention claimed is:

1. A model material composition for shaping a model material by a material jetting optical shaping method, comprising a polymerizable compound, a photopolymerization initiator and a siloxane compound having one polymerizable group per molecule,
wherein the siloxane compound has a number average molecular weight of 300 to 10,000,
wherein the polymerizable group in the siloxane compound is a group selected from the group consisting of an acryloyl group, a methacryloyl group, a vinyl group, an allyl group and a vinyl ether group, and
wherein the model material composition comprises the siloxane compound in an amount of 0.005 to 5% by mass, with respect to a total mass of the model material composition.

2. The model material composition according to claim 1, wherein, when the model material composition drips and lands on a cured article of the model material composition, a contact angle of a droplet of the model material composition against the cured article as measured 0.3 seconds after the landing is 40° or more.

3. The model material composition according to claim 1, wherein the model material composition has a surface tension of 24 to 30 mN/m.

4. The model material composition according to claim 1, wherein the siloxane compound is a siloxane compound having the polymerizable group at one end thereof.

5. The model material composition according to claim 1, wherein the siloxane compound has a structure represented by formula (1):

$$R^1-\overset{CH_2}{\underset{\|}{C}}-\overset{O}{\underset{\|}{C}}-O-R^3-\underset{\underset{CH_3}{|}}{\overset{\overset{CH_3}{|}}{Si}}-(O-\underset{\underset{CH_3}{|}}{\overset{\overset{CH_3}{|}}{Si}})_{\overline{n}}-R^2. \quad (1)$$

wherein:
  $R^1$ represents a hydrogen atom or a methyl group;
  $R^2$ represents a hydrogen atom or an alkyl group having 1 to 4 carbon atoms;
  $R^3$ is selected from the group consisting of $(CH_2)_m$, $(EO)_x$, $(PO)_y$, and a combination thereof;
  m represents a numerical value of 1 to 10;
  (EO) represents $(C_2H_4O)$;
  (PO) represents $(C_3H_6O)$;
  x and y independently represent a numerical value of 0 to 50; and
  n represents a numerical value of 3 to 220.

6. The model material composition according to claim 1, wherein the polymerizable compound comprises a monofunctional ethylenically unsaturated monomer (A), a polyfunctional ethylenically unsaturated monomer (B) and an oligomer (C).

7. The model material composition according to claim 6, wherein the model material composition comprises the monofunctional ethylenically unsaturated monomer (A) in an amount of 50% by mass or more, with respect to a total mass of the polymerizable compound.

8. The model material composition according to claim 6, wherein the model material composition comprises the polyfunctional ethylenically unsaturated monomer (B) in an amount of 1 to 30% by mass, with respect to the total mass of the polymerizable compound.

9. The model material composition according to claim 6, wherein the model material composition comprises the oligomer (C) in an amount of 1 to 30% by mass, with respect to the total mass of the polymerizable compound.

10. The model material composition according to claim 6, wherein the monofunctional ethylenically unsaturated monomer (A) is a monofunctional ethylenically unsaturated monomer having a cyclic structure in the molecule thereof.

11. The model material composition according to claim 6, wherein an SP value of each of the monofunctional ethylenically unsaturated monomer (A) and the polyfunctional ethylenically unsaturated monomer (B) is 11.0 or less.

12. The model material composition according to claim 1, wherein the model material composition further comprises a coloring agent.

13. A composition set for material jetting optical shaping, comprising the model material composition according to claim 1 and a support material composition for shaping a support material by a material jetting optical shaping method.

14. The composition set for material jetting optical shaping according to claim 13, wherein the support material composition is soluble in water.

15. A method for producing an optically shaped article using the model material composition according to claim 1, the method comprising irradiating the model material composition or the composition set with an active energy ray in a wavelength of 320 to 410 nm at an accumulated light amount of 300 mJ/cm$^2$ or more per layer to cure the model material composition.

16. A method for producing an optically shaped article using the model material composition according to the composition set for material jetting optical shaping according to claim 13, the method comprising irradiating the model material composition or the composition set with an active energy ray in a wavelength of 320 to 410 nm at an accumulated light amount of 300 mJ/cm$^2$ or more per layer to cure the model material composition.

* * * * *